United States Patent
Zhang et al.

(10) Patent No.: US 12,374,034 B2
(45) Date of Patent: Jul. 29, 2025

(54) GENERATING SOFT OBJECT SHADOWS FOR GENERAL SHADOW RECEIVERS WITHIN DIGITAL IMAGES USING GEOMETRY-AWARE BUFFER CHANNELS

(71) Applicant: Adobe Inc., San Jose, CA (US)

(72) Inventors: Jianming Zhang, Campbell, CA (US); Yichen Sheng, West Lafayette, IN (US); Julien Philip, London (GB); Yannick Hold-Geoffroy, Quebec City (CA); Xin Sun, Sunnyvale, CA (US); He Zhang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 194 days.

(21) Appl. No.: 18/168,995

(22) Filed: Feb. 14, 2023

(65) Prior Publication Data
US 2024/0273813 A1      Aug. 15, 2024

(51) Int. Cl.
G06T 15/60      (2006.01)
G06T 7/60      (2017.01)
G06V 10/60      (2022.01)
G06V 10/74      (2022.01)
G06V 10/82      (2022.01)

(52) U.S. Cl.
CPC ............... *G06T 15/60* (2013.01); *G06T 7/60* (2013.01); *G06V 10/60* (2022.01); *G06V 10/761* (2022.01); *G06V 10/82* (2022.01)

(58) Field of Classification Search
CPC ......... G06T 15/60; G06T 7/60; G06V 10/761; G06V 10/60; G06V 10/82

USPC ........................................................ 345/426
See application file for complete search history.

(56) References Cited

U.S. PATENT DOCUMENTS

| | | | |
|---|---|---|---|
| 8,379,021 B1 * | 2/2013 | Miller .................... | G06T 15/60 345/426 |
| 11,335,004 B2 | 5/2022 | Liu et al. | |
| 2015/0348315 A1 * | 12/2015 | Wang .................... | G06V 10/56 345/426 |

(Continued)

OTHER PUBLICATIONS

Adam Paszke, Sam Gross, Francisco Massa, Adam Lerer, 970 James Bradbury, Gregory Chanan, Trevor Killeen, Zeming Lin, Natalia Gimelshein, Luca Antiga, et al. Pytorch: An imperative style, high-performance deep learning library. Advances in neural information processing systems, 32, 2019.

(Continued)

*Primary Examiner* — Hai Tao Sun
(74) *Attorney, Agent, or Firm* — Keller Preece PLLC

(57) ABSTRACT

The present disclosure relates to systems, methods, and non-transitory computer-readable media that generates object shadows for digital images utilizing corresponding geometry-aware buffer channels. For instance, in one or more embodiments, the disclosed systems generate, utilizing a height prediction neural network, an object height map for a digital object portrayed in a digital image and a background height map for a background portrayed in the digital image. The disclosed systems also generate, from the digital image, a plurality of geometry-aware buffer channels using the object height map and the background height map. Further, the disclosed systems modify the digital image to include a soft object shadow for the digital object using the plurality of geometry-aware buffer channels.

20 Claims, 15 Drawing Sheets

(56) References Cited

U.S. PATENT DOCUMENTS

2022/0092812 A1* 3/2022 Boudreaux ........... G06F 18/214
2022/0292684 A1   9/2022 Wang et al.

OTHER PUBLICATIONS

Angel X Chang, Thomas Funkhouser, Leonidas Guibas, Pat Hanrahan, Qixing Huang, Zimo Li, Silvio Savarese, Manolis Savva, Shuran Song, Hao Su, et al. Shapenet: An information-rich 3d model repository. arXiv preprint arXiv:1512.03012, 2015.

Angjoo Kanazawa, Michael J Black, David W Jacobs, and Jitendra Malik. End-to-end recovery of human shape and pose. In Proceedings of the IEEE conference on computer vision and pattern recognition, pp. 7122-7131, 2018.

Ayan Sinha, Asim Unmesh, Qixing Huang, and Karthik Ramani. Surfnet: Generating 3d shape surfaces using deep residual networks. In Proceedings of the IEEE conference on computer vision and pattern recognition, pp. 6040-6049, 2017.

Ben Mildenhall, Pratul P. Srinivasan, Matthew Tancik, Jonathan T. Barron, Ravi Ramamoorthi, and Ren Ng. NeRF: representing scenes as neural radiance fields for view synthesis. Communications of the ACM, 65(1):99-106, Jan. 2022.

Chen Kong, Chen-Hsuan Lin, and Simon Lucey. Using locally corresponding cad models for dense 3d reconstructions from a single image. In Proceedings of the IEEE conference on computer vision and pattern recognition, pp. 4857-4936 4865, 2017.

Christoph Lassner, Javier Romero, Martin Kiefel, Federica Bogo, Michael J Black, and Peter V Gehler. Unite the people: Closing the loop between 3d and 2d human representations. In Proceedings of the IEEE conference on computer vision and pattern recognition, pp. 6050-6059, 2017.

Cyril Soler and Francois X. Sillion. Fast calculation of soft shadow textures using convolution. In Proceedings of the 25th annual conference on Computer graphics and interactive techniques—SIGGRAPH '98, pp. 321-332, Not Known, 1998. ACM Press.

Daquan Liu, Chengjiang Long, Hongpan Zhang, Hanning Yu, Xinzhi Dong, and Chunxia Xiao. Arshadowgan: Shadow generative adversarial network for augmented reality in single light scenes. In Proceedings of the IEEE/CVF Conference on Computer Vision and Pattern Recognition, pp. 8139-8148, 2020.

David Griffiths, Tobias Ritschel, and Julien Philip. Out-cast: Single image relighting with cast shadows. Computer Graphics Forum, 43, 2022.

Donglai Xiang, Hanbyul Joo, and Yaser Sheikh. Monocular Total Capture: Posing Face, Body, and Hands in the Wild. In 2019 IEEE/CVF Conference on Computer Vision and Pat-tern Recognition (CVPR), pp. 10957-10966, Long Beach, CA, USA, Jun. 2019. IEEE.

E. Reinhard, M. Adhikhmin, B. Gooch, and P. Shirley. Color transfer between images. IEEE Computer Graphics and Applications, 21(5):34-41, Jul. 2001. Conference Name: IEEE Computer Graphics and Applications.

Eric Chan and Fredo Durand. Rendering Fake Soft Shadows with Smoothies. p. 12.

F. Pitie, A.C. Kokaram, and R. Dahyot. N-dimensional prob- bility density function transfer and its application to color transfer. In Tenth IEEE International Conference on Computer Vision (ICCV'05) vol. 1, vol. 2, pp. 1434-1439 vol. 2, Oct. 2005. ISSN: 2380-7504.

Federica Bogo, Angjoo Kanazawa, Christoph Lassner, Peter Gehler, Javier Romero, and Michael J Black. Keep it smpl: Automatic estimation of 3d human pose and shape from a single image. In European conference on computer vision, pp. 561-578. Springer, 2016.

Francois X Sillion, James Arvo, Stephen Westin, and Donald P Greenberg. A Global Illumination Solution for General Reflectance Distributions. Computer Graphics, 25(4):11, 1991.

Gael Guennebaud, Loic Barthe, and Mathias Paulin. High-Quality Adaptive Soft Shadow Mapping. Computer Graph-ics Forum, 26(3):525-533, Sep. 2007.

Gael Guennebaud, Loic Barthe, and Mathias Paulin. Real-time soft shadow mapping by backprojection. p. 8.

Georgios Pavlakos, Vasileios Choutas, Nima Ghorbani, Timo Bolkart, Ahmed A. Osman, Dimitrios Tzionas, and Michael J. Black. Expressive Body Capture: 3D Hands, Face, and Body From a Single Image. In 2019 IEEE/CVF Conference on Computer Vision and Pattern Recognition (CVPR), pp. 10967-10977, Long Beach, CA, USA, Jun. 2019. IEEE.

Hao Zhou, Sunil Hadap, Kalyan Sunkavalli, and David Ja-cobs. Deep Single-Image Portrait Relighting. In 2019 IEEE/CVF International Conference on Computer Vision (ICCV), pp. 7193-7201, Seoul, Korea (South), Oct. 2019. IEEE.

James T Kajiya. The rendering equation. In Proceedings of the 13th annual conference on Computer graphics and interactive techniques, pp. 143-150, 1986.

Jeya Maria Jose Valanarasu, He Zhang, Jianming Zhang, Yilin Wang, Zhe Lin, Jose Echevarria, Yinglan Ma, Zijun Wei, Kalyan Sunkavalli, and Vishal M Patel. Interactive portrait harmonization. arXiv preprint arXiv:2203.08216, 2022.

Jhony K Pontes, Chen Kong, Anders Eriksson, Clinton Fookes, Sridha Sridharan, and Simon Lucey. Compact model representation for 3d reconstruction. arXiv preprint arXiv:1707.07360, 2017.

Jhony K Pontes, Chen Kong, Sridha Sridharan, Simon Lucey, Anders Eriksson, and Clinton Fookes. Image2mesh: A learning framework for single image 3d reconstruction. In Asian Conference on Computer Vision, pp. 365-381. Springer, 2018.

Jiaya Jia, Jian Sun, Chi-Keung Tang, and Heung-Yeung Shum. Drag-and-drop pasting. ACM Transactions on Graphics, 25(3):631-637, Jul. 2006.

Julien Philip, Michael Gharbi, Tinghui Zhou, Alexei A Efros, and George Drettakis. Multi-view relighting using a geometry-aware network. ACM Trans. Graph., 38(4):78-1, 2019.

Julien Philip, Sebastien Morgenthaler, Michael Gharbi, and George Drettakis. Free-viewpoint indoor neural relighting from multi-view stereo. ACM Transactions on Graphics (TOG), 40(5):1-18, 2021.

Jun Ling, Han Xue, Li Song, Rong Xie, and Xiao Gu. Region-aware adaptive instance normalization for image harmonization. In Proceedings of the IEEE/CVF Conference on Computer Vision and Pattern Recognition, pp. 9361-9946 9370, 2021.

Konstantin Sofiiuk, Polina Popenova, and Anton Konushin. Foreground-aware semantic representations for image harmonization. In Proceedings of the IEEE/CVF Winter Conference on Applications of Computer Vision, pp. 1620-1629, 2021.

Lance Williams. Casting Curved Shadows on Curved Surfaces. p. 5.

Marc Stamminger and George Drettakis. Perspective shadow maps. In John Hughes, editor, Proceedings of ACM SIGGRAPH, Annual Conference Series, pp. 557-562. ACM Press/ ACM SIGGRAPH, Jul. 2002.

Michael Schwarz and Marc Stamminger. Bitmask Soft Shadows. Computer Graphics Forum, 26(3):515-524, Sep. 2007.

Michael W. Tao, Micah K. Johnson, and Sylvain Paris. Error Tolerant Image Compositing. In Kostas Daniilidis, Petros Maragos, and Nikos Paragios, editors, Computer Vision—ECCV 2010, Lecture Notes in Computer Science, pp. 31-44, Berlin, Heidelberg, 2010. Springer.

Patrick Perez, Michel Gangnet, and Andrew Blake. Poisson image editing. In ACM SIGGRAPH 2003 Papers, pp. 313-318. 2003.

Phillip Isola, Jun-Yan Zhu, Tinghui Zhou, and Alexei A Efros. Image-to-image translation with conditional adversarial networks. In Proceedings of the IEEE conference on computer vision and pattern recognition, pp. 1125-1134, 2017.

Pradeep Sen, Mike Cammarano, and Pat Hanrahan. Shadow silhouette maps. ACM Transactions on Graphics (TOG), 22(3):521-526, 2003.

Pratul P. Srinivasan, Boyang Deng, Xiuming Zhang, Matthew Tancik, Ben Mildenhall, and Jonathan T. Barron. NeRV: Neural Reflectance and Visibility Fields for Relighting and View Synthesis. In 2021 IEEE/CVF Conference on Computer Vision and Pattern Recognition (CVPR), pp. 7491-7500, Nashville, TN, USA, Jun. 2021. IEEE.

Randima Fernando. Percentage-closer soft shadows. In ACM SIGGRAPH 2005 Sketches on—SIGGRAPH '05, p. 35, Los Angeles, California, 2005. ACM Press.

(56) References Cited

OTHER PUBLICATIONS

Ren Ng, Ravi Ramamoorthi, and Pat Hanrahan. All Frequency Shadows Using Non-linear Wavelet Lighting Approximation. p. 6.
Ricardo Martin-Brualla, Noha Radwan, Mehdi S. M. Sajjadi, Jonathan T. Barron, Alexey Dosovitskiy, and Daniel Duckworth. NeRF in the Wild: Neural Radiance Fields for Unconstrained Photo Collections. In 2021 IEEE/CVF Conference on Computer Vision and Pattern Recognition (CVPR), pp. 961 7206-7215, Nashville, TN, USA, Jun. 2021. IEEE.
Richard Zhang, Jun-Yan Zhu, Phillip Isola, Xinyang Geng, Angela S. Lin, Tianhe Yu, and Alexei A. Efros. Real-Time User-Guided Image Colorization with Learned Deep Priors. Technical Report arXiv:1705.02999, arXiv, May 2017. arXiv:1705.02999 [cs] type: article.
Robert L Cook, Thomas Porter, and Loren Carpenter. Computer Graphics vol. 18, No. 3 Jul. 1984. p. 9, 1984.
Shunsuke Saito, Tomas Simon, Jason Saragih, and Hanbyul Joo. Pifuhd: Multi-level pixel-aligned implicit function for high-resolution 3d human digitization. In Proceedings of 1026 the IEEE/CVF Conference on Computer Vision and Pattern 1027 Recognition, pp. 84-93, 2020.
Shunsuke Saito, Zeng Huang, Ryota Natsume, Shigeo Morishima, Angjoo Kanazawa, and Hao Li. Pifu: Pixel-aligned implicit function for high-resolution clothed human digitization. In Proceedings of the IEEE/CVF International Conference on Computer Vision, pp. 2304-2314, 2019.
Shuyang Zhang, Runze Liang, and Miao Wang. Shadowgan: Shadow synthesis for virtual objects with conditional adversarial networks. Computational Visual Media, 5(1):105-115, 2019.
Stephen H Westin, James R Arvo, and Kenneth E Torrance. Predicting Reflectance Functions from Complex Surfaces. p. 10.
Thomas Annen, Zhao Dong, Tom Mertens, Philippe Bekaert, Hans-Peter Seidel, and Jan Kautz. Real-time, all-frequency shadows in dynamic scenes. ACM Transactions on Graphics, 27(3):1-8, Aug. 2008.
Tiancheng Sun, Jonathan T. Barron, Yun-Ta Tsai, Zexiang Xu, Xueming Yu, Graham Fyffe, Christoph Rhemann, Jay Busch, Paul Debevec, and Ravi Ramamoorthi. Single image portrait relighting. ACM Transactions on Graphics, 38(4):1-12, Aug. 2019.
Ulf Assarsson and Tomas Akenine-Moller. A Geometry-based Soft Shadow vol. Algorithm using Graphics Hard-ware. p. 10.
Viktor Rudnev, Mohamed Elgharib, William Smith, Lingjie Liu, Vladislav Golyanik, and Christian Theobalt. NeRF for Outdoor Scene Relighting. In Shai Avidan, Gabriel Brostow, Moustapha Cissé, Giovanni Maria Farinella, and Tal Hassner, editors, Computer Vision—ECCV 2022, vol. 13676, pp. 615-631, Cham, 2022. Springer Nature Switzerland. Series Title: Lecture Notes in Computer Science.
Wenyan Cong, Jianfu Zhang, Li Niu, Liu Liu, Zhixin Ling, Weiyuan Li, and Liqing Zhang. Dovenet: Deep image harmonization via domain verification. In Proceedings of the IEEE/CVF Conference on Computer Vision and Pattern Recognition, pp. 8394-8403, 2020.
Wikipedia. Fresnel equations. https://en.wikipedia.org/wiki/Fresnel_equations.
William Donnelly and Andrew Lauritzen. Variance shadow maps. In Proceedings of the 2006 symposium on Interactive 3D graphics and games—SI3D '06, p. 161, Redwood City, California, 2006. ACM Press.
William T Reeves, David H Salesin, and Robert L Cook. Rendering antialiased shadows with depth maps. In Proceedings of the 14th annual conference on Computer graphics and interactive techniques, pp. 283-291, 1987.
Xiaowei Hu, Yitong Jiang, Chi-Wing Fu, and Pheng-Ann Heng. Mask-shadowgan: Learning to remove shadows from unpaired data. In Proceedings of the IEEE/CVF International Conference on Computer Vision, pp. 2472-2481, 2019.
Yi-Hsuan Tsai, Xiaohui Shen, Zhe Lin, Kalyan Sunkavalli, Xin Lu, and Ming-Hsuan Yang. Deep Image Harmonization. In 2017 IEEE Conference on Computer Vision and Pattern Recognition (CVPR), pp. 2799-2807, Honolulu, HI, Jul. 2017. IEEE.
Yichen Sheng, Jianming Zhang, and Bedrich Benes. Ssn: Soft shadow network for image compositing. In Proceedings of the IEEE/CVF Conference on Computer Vision and Pattern Recognition, pp. 4380-4390, 2021.
Yichen Sheng, Yifan Liu, Jianming Zhang, Wei Yin, A Cengiz Oztireli, He Zhang, Zhe Lin, Eli Shechtman, and Bedrich Benes. Controllable shadow generation using pixel height maps. In European Conference on Computer Vision, pp. 240-256. Springer, 2022.
Yifan Jiang, He Zhang, Jianming Zhang, Yilin Wang, Zhe Lin, Kalyan Sunkavalli, Simon Chen, Sohrab Amirghodsi, Sarah Kong, and Zhangyang Wang. SSH: A Self-Supervised Framework for Image Harmonization. In 2021 IEEE/CVF. preprint arXiv:2108.06805, 2021. 2International Conference on Computer Vision (ICCV), pp. 918 4812-4821, Montreal, QC, Canada, Oct. 2021. IEEE.
Yifan Liu, Zengchang Qin, Tao Wan, and Zhenbo Luo. Auto-painter: Cartoon image generation from sketch by using conditional wasserstein generative adversarial networks. Neuro-computing, 311:78-87, 2018.
Yifan Wang, Brian L Curless, and Steven M Seitz. People as scene probes. In European Conference on Computer Vision, pp. 438-454. Springer, 2020.
Yuanlu Xu, Song-Chun Zhu, and Tony Tung. DenseRaC: Joint 3D Pose and Shape Estimation by Dense Render-and-Compare. In 2019 IEEE/CVF International Conference on Computer Vision (ICCV), pp. 7759-7769, Seoul, Korea (South), Oct. 2019. IEEE.
Zerong Zheng, Tao Yu, Yixuan Wei, Qionghai Dai, and Yebin Liu. Deephuman: 3d human reconstruction from a single image. In Proceedings of the IEEE/CVF International Conference on Computer Vision, pp. 7739-7749, 2019.
Zhirong Wu, Shuran Song, Aditya Khosla, Fisher Yu, Lin- guang Zhang, Xiaoou Tang, and Jianxiong Xiao. 3d shapenets: A deep representation for volumetric shapes. In Proceedings of the IEEE conference on computer vision and pattern recognition, pp. 1912-1920, 2015.
Zhixin Shu, Sunil Hadap, Eli Shechtman, Kalyan Sunkavalli, Sylvain Paris, and Dimitris Samaras. Portrait Lighting Transfer Using a Mass Transport Approach. ACM Transactions on Graphics, 37(1):2:1-2:15, Oct. 2017.

* cited by examiner

| Methods | L2 ↓ | SSIM ↑ | PSNR ↑ |
|---|---|---|---|
| SSN | 5.423 | 0.942 | 41.099 |
| SSN w. BG-H | 5.195 | 0.956 | 41.459 |
| Buffer channels(ours) | 4.718 | 0.964 | 41.895 |

Fig. 8

GENERATING SOFT OBJECT SHADOWS FOR GENERAL SHADOW RECEIVERS WITHIN DIGITAL IMAGES USING GEOMETRY-AWARE BUFFER CHANNELS

BACKGROUND

Recent years have seen significant advancement in hardware and software platforms for editing digital images. Indeed, as the use of digital images has become increasingly ubiquitous, systems have developed to facilitate the manipulation of the content within such digital images. For example, in the field of digital image editing, computer-implemented tools or models can alter how digital objects appear within digital images, such as by creating shadows cast by digital objects across the backgrounds of the digital images.

SUMMARY

One or more embodiments described herein provide benefits and/or solve one or more problems in the art with systems, methods, and non-transitory computer-readable media that flexibly generate accurate object shadows for general shadow receivers within digital images utilizing spatially-aware buffer channels. To illustrate, in one or more embodiments, a system defines a set of buffer channels that provide representations of digital images having three-dimensional awareness. The system further creates one or more of the buffer channels for a digital image to be modified. For instance, in some cases, the system creates at least one of the buffer channels using one or more height maps corresponding to the digital image. Using the buffer channels, the system guides a neural renderer to generate a shadow (e.g., a soft object shadow) for a digital object portrayed within the digital image. In this manner, the system implements a flexible shadow rendering algorithm that generates accurate shadow representations across general surfaces portrayed in digital images, including non-planar surfaces.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 8 illustrates a table reflecting experimental results regarding the effectiveness of the height-based shadowing system in accordance with one or more embodiment;

DETAILED DESCRIPTION

Figure 1:
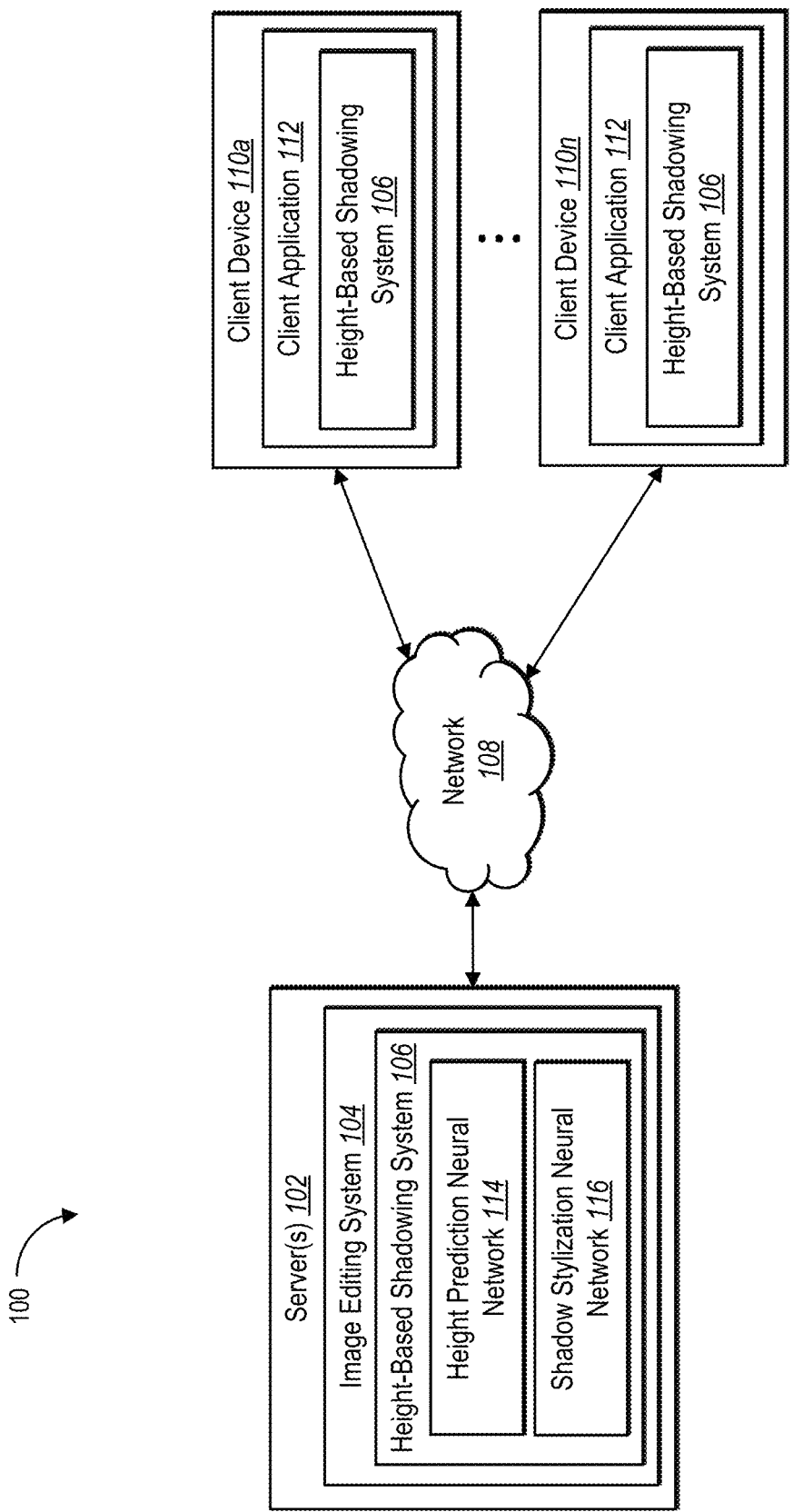
FIG. 1 illustrates an example environment in which a height-based shadowing system operates in accordance with one or more embodiments.

One or more embodiments described herein include a height-based shadowing system that flexibly generalizes shadow rendering within digital images utilizing buffer channels representing the geometry of the content portrayed therein. As indicated above, the field of digital image editing implements various systems that utilize computer-implemented tools or models to alter how digital objects appear within digital images, such as by creating shadows for the digital objects within the digital images. These systems, however, suffer from several technological shortcomings that result in inflexible and inaccurate operation.

To illustrate, conventional image shadowing systems are typically inflexible in that they implement shadow rendering algorithms for a limited set of shadow receivers. For example, many conventional systems generate shadows based on an assumption that the shadow receiver of a digital image is a planar surface and that the object for which the shadow is to be generated is positioned on top of the planar surface. Accordingly, such systems fail to flexibly accommodate other scenarios portrayed within digital images, such as those where the shadow receiver includes a non-planer surface (e.g., having a wall or a corner) and/or the object is located somewhere other than on top of the portrayed surface.

Additionally, conventional image shadowing systems often fail to operate accurately. In particular, conventional systems often fail to generate shadows that accurately represent a projection of an object across a background of a digital image in accordance with an associated light source. For instance, by generating shadows based a limited assumption of non-planar surfaces and object positioning, conventional systems typically fail to generate accurate shadows within digital images that do not satisfy that assumption. Indeed, where digital images fail to satisfy the assumption, the generated shadows appear unnatural against their respective backgrounds, causing unrealistic image results. For example, composite images produced using such shadow rendering techniques often fail to realistically portray the object against the composition background.

As suggested, in one or more embodiments, the height-based shadowing system implements a generalized shadow rendering algorithm using buffer channels. In particular, in some embodiments, the height-based shadowing system utilizes one or more buffer channels to provide key spatial awareness that guides the neural renderer (e.g., a neural network) in the shadow rendering process. In some cases, the height-based shadowing system creates one or more buffer channels for a digital image based on the distances between background pixels and object pixels portrayed therein. In some instance, the height-based shadowing system creates one or more buffer channels using one or more height maps generated for the digital image. Thus, the height-based shadowing system utilizes the neural renderer to generate a shadow for a digital object within a digital image based on geometry-aware information included in the buffer channels.

To illustrate, in one or more embodiments, the height-based shadowing system generates, utilizing a height prediction neural network, an object height map for a digital object portrayed in a digital image and a background height map for a background portrayed in the digital image. Further, the height-based shadowing system generates, from the digital image, a plurality of geometry-aware buffer channels using the object height map and the background height map. Using the plurality of geometry-aware buffer channels, the height-based shadowing system modifies the digital image to include a soft object shadow for the digital object.

As indicated above, in one or more embodiments, the height-based shadowing system generates one or more geometry-aware buffer channels for a digital image. In particular, the height-based shadowing system generates geometry-aware buffer channels that include spatial awareness regarding geometry of the digital image. The particular geometry-aware buffer channels created by the height-based shadowing system varies in different embodiments.

For instance, in some embodiments, the height-based shadowing system generates one or more geometry-aware buffer channels for a digital image based on distances between pixels portrayed therein. In particular, the height-based shadowing system generates one or more geometry-aware buffer channels based on distance between pixels of a digital object portrayed therein and corresponding pixels of the background (e.g., pixels that represent shadow projections onto the background). In some cases, the height-based shadowing system measures these distances using a relative distance measurement and/or a pixel height difference measurement.

In some implementations, the height-based shadowing system generates at least one geometry-aware buffer channel for a digital image using one or more height maps created for the digital image. Indeed, in some cases, the height-based shadowing system generates, for a digital image, one or more height maps that provide pixels heights for the pixels represented therein. For instance, in some instances, the height-based shadowing system generates an object height map for the pixels of a digital object portrayed within a digital image and/or a background height map for the pixels of a background portrayed within the digital image. In some embodiments, the height-based shadowing system generates a geometry-aware buffer channel using a height map by generating a geometry-aware buffer channel that includes a gradient of the height map.

As further mentioned, in one or more embodiments, the height-based shadowing system utilizes the geometry-aware buffer channels created for a digital image to generate a soft object shadow for a digital object portrayed therein. In particular, in some embodiments, the height-based shadowing system utilizes a shadow stylization neural network to generate the soft object shadow based on the geometry-aware buffer channels. Accordingly, in some cases, the height-based shadowing system modifies the digital image to include the soft object shadow, providing a result where the digital object appears to cast a shadow across the background of the digital image.

In some cases, the height-based shadowing system further determines a softness value for generating the soft object shadow. For instance, in some cases, the height-based shadowing system provides a softness value to the shadow stylization neural network, which generates the resulting soft object shadow based on the softness values. In some implementations, the height-based shadowing system receives the softness value from a client device, such as the client device that submitted the digital image for modification.

The height-based shadowing system provides advantages over conventional systems. For example, the height-based shadowing system operates with improved flexibility when compared to conventional systems. In particular, the height-based shadowing system flexibly generates object shadows for a broader set of shadow receivers portrayed in digital images. Indeed, by generating geometry-aware buffer channels for a digital image, the height-based shadowing system determines geometry and spatial information for the content portrayed therein and subsequently generates an object shadow based on this information. Accordingly, the height-based shadowing system generalizes shadow receivers for which shadow rendering is performed to include surfaces that are not accommodated under conventional systems-such as non-planar surfaces. Further, by utilizing geometry-aware buffer channels to generate object shadows, the height-based shadowing system more flexibly generates object shadows in scenarios where a digital object is not positioned directly on a ground surface.

The height-based shadowing system further operates with improved accuracy when compared to conventional systems. Indeed, by generalizing the shadow receivers for which shadow rendering is performed, the height-based shadowing system generates object shadows that more accurately represent the shadow projections of digital objects across these shadow receivers in many instances. For instance, the height-based shadowing system generates more accurate object shadows across non-planar surfaces when compared to conventional systems.

Additional detail regarding the height-based shadowing system will now be provided with reference to the figures. For example, FIG. 1 illustrates a schematic diagram of an exemplary system 100 in which a height-based shadowing system 106 operates. As illustrated in FIG. 1, the system 100 includes a server(s) 102, a network 108, and client devices 110a-110n.

Although the system 100 of FIG. 1 is depicted as having a particular number of components, the system 100 is capable of having any number of additional or alternative components (e.g., any number of servers, client devices, or other components in communication with the height-based shadowing system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 11). Moreover, the server(s) 102 and the client devices 110a-110n include one or more of a variety of computing devices (including one or more computing devices as discussed in greater detail with relation to FIG. 11).

As mentioned above, the system 100 includes the server(s) 102. In one or more embodiments, the server(s) 102 generates, stores, receives, and/or transmits data, including digital images and modified digital images (e.g., digital images modified to include object shadows for digital objects portrayed in the digital images). In one or more embodiments, the server(s) 102 comprises a data server. In some implementations, the server(s) 102 comprises a communication server or a web-hosting server.

In one or more embodiments, the image editing system 104 provides functionality by which a client device (e.g., one of the client devices 110a-110n) generates, edits, manages, and/or stores digital images. For example, in some instances, a client device sends a digital image to the image editing system 104 hosted on the server(s) 102 via the network 108. The image editing system 104 then provides many options that the client device may use to edit the digital image, store the digital image, and subsequently search for, access, and view the digital image.

In one or more embodiments, the client devices 110a-110n include computing devices that display and/or modify digital images. For example, the client devices 110a-110n include one or more of smartphones, tablets, desktop computers, laptop computers, head-mounted-display devices, and/or other electronic devices. In some instances, the client devices 110a-110n include one or more applications (e.g., the client application 112) that display and/or modify digital images. For example, in one or more embodiments, the client application 112 includes a software application installed on the client devices 110a-110n. Additionally, or alternatively, the client application 112 includes a web browser or other application that accesses a software application hosted on the server(s) 102 (and supported by the image editing system 104).

To provide an example implementation, in some embodiments, the height-based shadowing system 106 on the server(s) 102 supports the height-based shadowing system 106 on the client device 110n. For instance, in some cases, the height-based shadowing system 106 on the server(s) 102 generates or learns parameters for the height prediction neural network 114 and the shadow stylization neural network 116. The height-based shadowing system 106 then, via the server(s) 102, provides the height prediction neural network 114 and the shadow stylization neural network 116 to the client device 110n. In other words, the client device 110n obtains (e.g., downloads) the height prediction neural network 114 and the shadow stylization neural network 116 (e.g., with any learned parameters) from the server(s) 102. Once downloaded, the height-based shadowing system 106 on the client device 110n utilizes the height prediction neural network 114 and the shadow stylization neural network 116 to generate object shadows (e.g., soft object shadows) for digital objects portrayed within digital images independent from the server(s) 102.

In alternative implementations, the height-based shadowing system 106 includes a web hosting application that allows the client device 110n to interact with content and services hosted on the server(s) 102. To illustrate, in one or more implementations, the client device 110n accesses a software application supported by the server(s) 102. In response, the height-based shadowing system 106 on the server(s) 102 modifies a digital image to include an object shadow for a digital object portrayed therein. The server(s) 102 then provides the modified digital image to the client device 110n for display.

Indeed, the height-based shadowing system 106 is able to be implemented in whole, or in part, by the individual elements of the system 100. Indeed, although FIG. 1 illustrates the height-based shadowing system 106 implemented with regard to the server(s) 102, different components of the height-based shadowing system 106 are able to be implemented by a variety of devices within the system 100. For example, one or more (or all) components of the height-based shadowing system 106 are implemented by a different computing device (e.g., one of the client devices 110a-110n) or a separate server from the server(s) 102 hosting the image editing system 104. Indeed, as shown in FIG. 1, the client devices 110a-110n include the height-based shadowing system 106. Example components of the height-based shadowing system 106 will be described below with regard to FIG. 11.

Figure 2A:
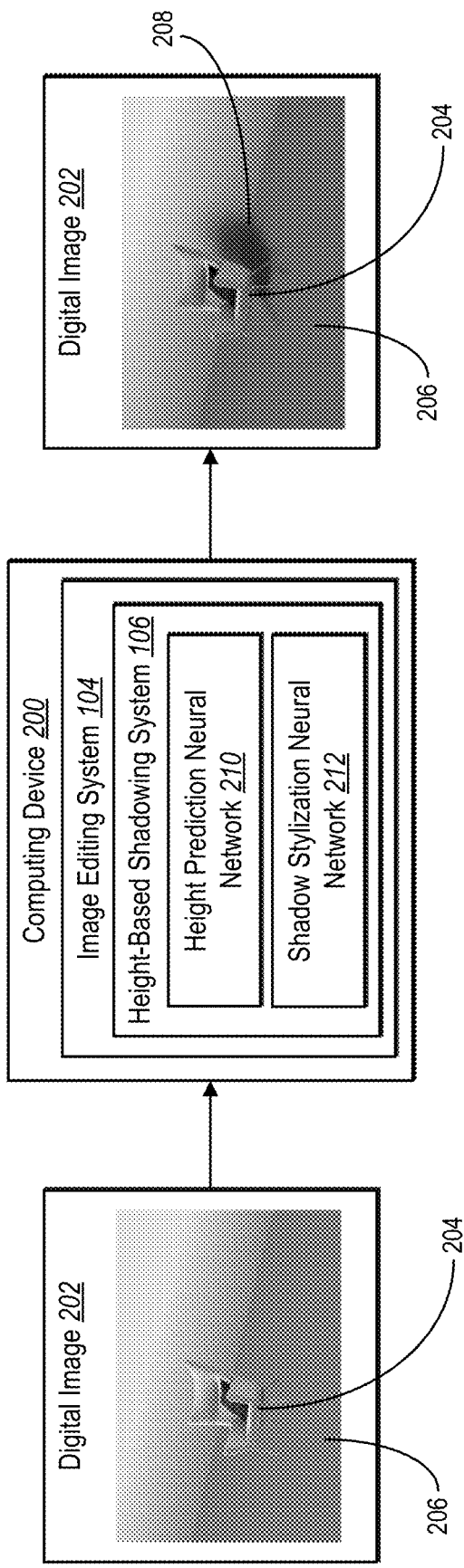
FIGS. 2A-2B illustrates overview diagrams of the height-based shadowing system modifying a digital image to include a soft object shadow for a digital object portrayed therein in accordance with one or more embodiments.
Figure 2B:
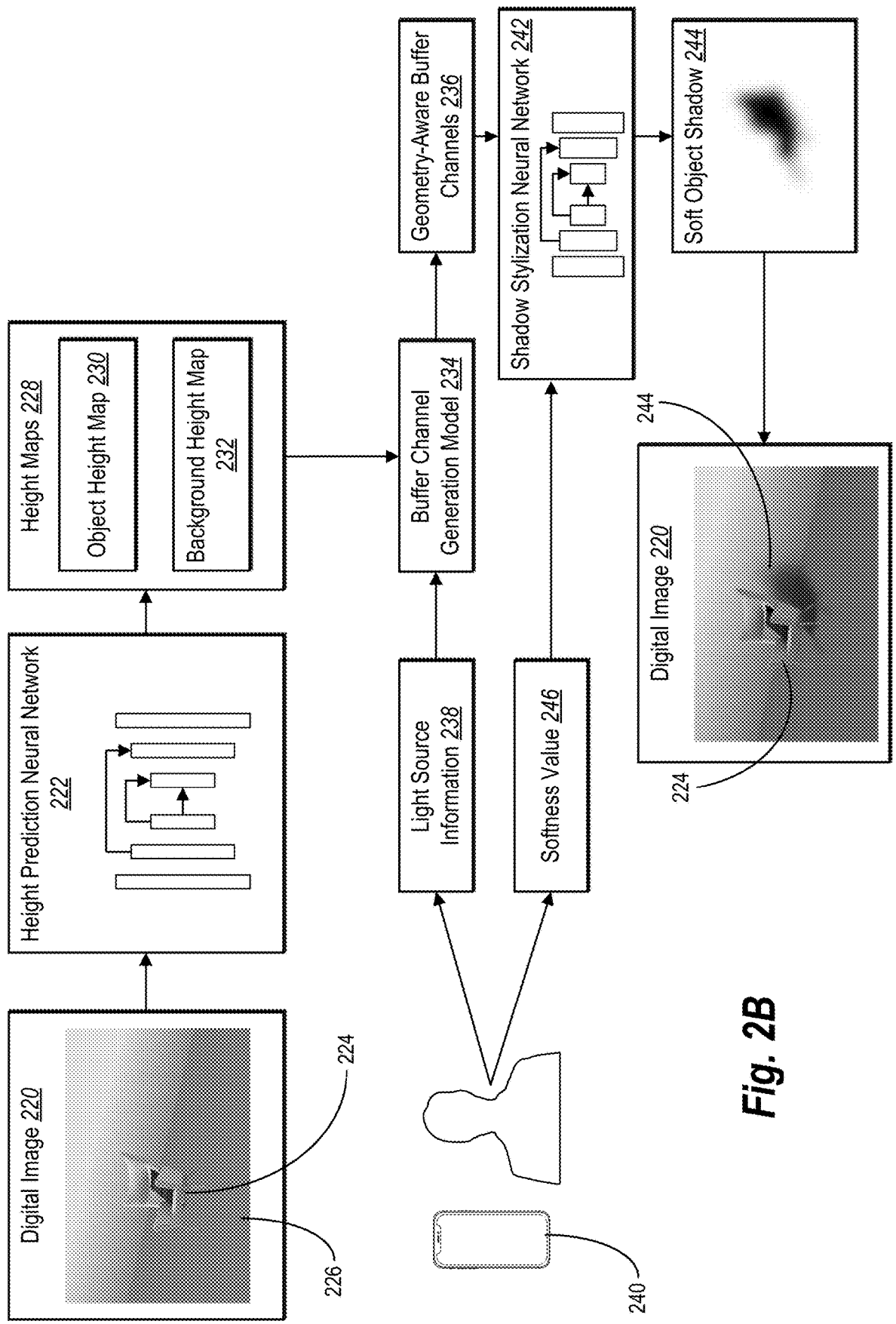

As mentioned above, in one or more embodiments, the height-based shadowing system 106 modifies a digital image to include an object shadow, such as a soft object shadow, for a digital object portrayed in the digital image. FIGS. 2A-2B illustrate overview diagrams of the height-based shadowing system 106 modifying a digital image to include an object shadow in accordance with one or more embodiments.

As shown in FIG. 2A, the height-based shadowing system 106 (operating on a computing device 200) receives, retrieves, or otherwise obtains a digital image 202. For instance, in one or more embodiments, the height-based shadowing system 106 receives the digital image 202 from a computing device (e.g., a server hosting a third-party system or a client device). In some embodiments, the height-based shadowing system 106 accesses the digital image 202 via a database storing digital images. For example, in at least one implementation, the height-based shadowing system 106 maintains a database and stores a plurality of digital images therein. In some instances, an external device or system stores one or more digital images for access by the height-based shadowing system 106.

As illustrated in FIG. 2A, the digital image 202 portrays a digital object 204 (e.g., a chair). In one or more embodiments, a digital object includes an item or object portrayed in a digital image. In particular, in some embodiments, a digital object includes an organic or non-organic object depicted in a digital image. To illustrate, in some cases, a digital object includes, but is not limited to, a person, an animal, a building, a plant, a vehicle, a piece of furniture, or a handheld item.

Additionally, as shown in FIG. 2A, the digital image 202 does not include an object shadow for the digital object 204. In one or more embodiments, an object shadow includes a shadow associated with a digital object. In particular, in some embodiments, an object shadow includes a shadow that is cast by a digital object within a digital image. For example, in some cases, an object shadow includes a shadow that is cast from a digital object across one or more surfaces (e.g., surfaces of a background) portrayed in the corresponding digital image. In some embodiments, an object shadow includes a shadow that is cast in accordance with the lighting conditions of the digital image. In some implementations, an object shadow includes a shadow that was captured along with the digital image. In some instances, however, an object shadow includes a shadow that is generated and associated with the digital object so that it appears to be cast by the digital object in accordance with the lighting conditions of the digital image.

In one or more embodiments, the lack of an object shadow is due to the nature of the digital image 202. For instance, in some cases, the digital object 204 was edited into the digital image 202 (e.g., via an image composition process or other editing process); therefore, the digital object 204 does not appear under the lighting conditions originally associated with the digital image 202 when captured. In some cases, the digital image 202 is composed of elements (including the digital object 204) manually edited together from various pre-configured image elements (e.g., computer-generated elements); therefore, the digital image 202 was created without lighting conditions at all.

As further illustrated by FIG. 2A, the digital image 202 portrays the digital object 204 against a background 206. In one or more embodiments, a background of a digital image includes portions of the digital image that are unoccupied by one or more digital objects portrayed in the digital image. In some instances, however, the background of a digital image includes portions of the digital image that are unoccupied by a targeted digital object. Indeed, in some cases, the height-based shadowing system 106 targets a particular digital object portrayed in a digital image (e.g., for generating an object shadow) and considers the remaining portions of the digital image to be part of the background. Thus, in some cases, the height-based shadowing system 106 considers a digital object portrayed in a digital image to be part of the background when targeting another digital object portrayed in the digital image for some process, such as generating an object shadow.

The background 206 shown in FIG. 2A includes a non-planar background. In one or more embodiments, a non-planar background includes a background that is defined by or composed of multiple planes. Indeed, in some embodiments, a non-planar background includes a background that is not lying or confined within a single plane. For example, in some cases, a non-planar background includes a single surface that is associated with multiple planes. In some implementations, a non-planar background includes multiple surfaces where at least one surface is associated with a different plane than at least one other surface. To illustrate, the background 206 of the digital image 202 includes a ground surface associated with a first plane and a wall surface associated with a second plane.

As shown in FIG. 2A, the height-based shadowing system 106 modifies the digital image 202 to include an object shadow 208 for the digital object 204. In particular, as shown, the object shadow 208 includes a soft object shadow. Indeed, in some implementations, an object shadow includes a hard object shadow or a soft object shadow. In one or more embodiments, a hard object shadow includes an object shadow having hard boundaries. In particular, in some embodiments, a hard object shadow includes an object shadow having boundaries that are clearly defined. For example, in some cases, a clear distinction exists between every portion (e.g., every edge) of a hard object shadow and the surrounding area. In contrast, in one or more embodiments, a soft object shadow includes an object shadow having one or more soft boundaries. In particular, in some embodiments, a soft object shadow includes an object shadow having one or more boundaries that are not clearly defined (e.g., blend into the surrounding area). For instance, in some cases, a soft object shadow includes an object shadow having at least a portion that appears to gradually fade into the surrounding area.

As illustrated, the height-based shadowing system 106 generates the object shadow 208 for inclusion within the digital image 202 using a height prediction neural network 210 and a shadow stylization neural network 212. For example, in one or more embodiments, the height-based shadowing system 106 utilizes the height prediction neural network 210 to generate a height map for the digital object 204 and/or the background 206 of the digital image 202. Further, the height-based shadowing system 106 utilizes the shadow stylization neural network 212 to generate the object shadow 208 based on the height maps (e.g., based on one or more geometry-aware buffer channels generated from the height maps). Generating height maps and object shadows using the corresponding geometry-aware buffer channels will be discussed in more detail below.

Though FIG. 2A illustrates the height-based shadowing system 106 generating an object shadow across a non-planar background, it should be understood that the height-based shadowing system 106 generates object shadows across various background types (including planar backgrounds) in various embodiments. Indeed, in one or more embodiments, the height-based shadowing system 106 generalizes the shadow rendering process utilizing the methods and models described herein to be compatible with a wide variety of shadow receivers. Accordingly, the height-based shadowing system 106 generates object shadows across different backgrounds—including non-planar backgrounds—providing an advantage over conventional systems, which typically cannot render shadows across such backgrounds.

FIG. 2B illustrates an overview diagram of the height-based shadowing system 106 employing various models to generate an object shadow for a digital image in accordance with one or more embodiments. As shown in FIG. 2B, the height-based shadowing system 106 utilizes a height prediction neural network 222 to analyze a digital image 220.

In one or more embodiments, a neural network includes a type of machine learning model, which can be tuned (e.g., trained) based on inputs to approximate unknown functions used for generating the corresponding outputs. In particular, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

In one or more embodiments, a height prediction neural network includes a computer-implemented neural network that generates height maps for digital images. In particular, in some embodiments, a height prediction neural network includes a neural network that analyzes a digital image and generates a height map for the digital image. For example, in some instances, the height prediction neural network analyzes one or more digital objects portrayed in a digital image and generates a height map (or multiple height maps) for the one or more digital objects. In some implementations, the height prediction neural network analyzes a background portrayed in a digital image and generates a height map (or multiple height maps) for the background. In some cases, the height prediction neural network analyzes the digital image (e.g., the one or more digital objects or the background) by analyzing one or more masks, one or more cutouts, and/or one or more coordinate schemes associated with the digital image. More detail regarding the learning, implementation, and architecture of a height prediction neural network used by the height-based shadowing system 106 in some cases will be discussed below with reference to FIGS. 3A-3D.

Indeed, as shown in FIG. 2B, the height-based shadowing system 106 utilizes the height prediction neural network 222 to generate height maps 228 based on the analysis of the digital image 220. In particular, the height-based shadowing system 106 utilizes the height prediction neural network 222 to generate an object height map 230 for a digital object 224 portrayed in the digital image 220. Further, the height-based shadowing system 106 utilizes the height prediction neural network 222 to generate a background height map 232 for a background 226 portrayed in the digital image 220.

In one or more embodiments, a height map includes a map of pixels to their corresponding pixel heights. In particular, in some embodiments, a height map includes a map indicating the pixel heights of pixels associated with one or more portions of a digital image. In some cases, a height map includes a one channel map having a single value for each represented pixel that indicates the pixel height of that pixel. In one or more implementations, the height map indicates pixel heights of pixels from a horizon line, ground surface, or other point of reference in the digital image.

In one or more embodiments, an object height map includes a height map indicating the pixel heights of pixels associated with one or more digital objects portrayed in a digital image. Similarly, in one or more embodiments, a background height map includes a height map indicating the pixel heights of pixels associated with a background portrayed in a digital image.

In one or more embodiments, a pixel height includes a height of a pixel within a digital image. In particular, in some embodiments, a pixel height includes a value or measurement that indicates a vertical distance of a pixel of a digital image from another point, such as another pixel of the digital image. To illustrate, in some implementations, a pixel height includes a measurement indicating the vertical distance of a pixel within a digital image with respect to a ground surface associated with (e.g., portrayed in) the digital image as measured in pixels.

As indicated, in some cases, the height-based shadowing system 106 utilizes the height prediction neural network 222 to generate the height maps 228 by analyzing the digital image 220. For instance, in some embodiments, the height prediction neural network 222 analyzes various components that correspond to the digital image 220 (e.g., components that are either included in, derived from, or otherwise associated with the digital image 220) and generates the height maps 228 based on the analysis as will be described in more detail below.

Though FIG. 2B shows generating the height maps 228 using the height prediction neural network 222, the height-based shadowing system 106 obtains the height maps 228 from various sources in different embodiments. For instance, in some cases, the height-based shadowing system 106 utilizes a three-dimensional model (e.g., a model rendering a three-dimensional scene that corresponds to the scene captured in the digital image 220) to generate the height maps 228. In some cases, the height-based shadowing system 106 receives height maps created via user input. For instance, in some implementations, the height-based shadowing system 106 receives user input providing pixel heights and creates the height maps 228 in response. In some embodiments, the height-based shadowing system 106 receives pre-generated height maps from a client device.

As further shown in FIG. 2B, the height-based shadowing system 106 utilizes a buffer channel generation model 234 to generate geometry-aware buffer channels 236 for the digital image 220. In one or more embodiments, a buffer channel generation model includes a computer-implemented model or algorithm that generates one or more geometry-aware buffer channels for a digital image. In particular, in some embodiments, a buffer channel generation model includes a computer-implemented model that analyzes a digital image (e.g., analyzes the digital image itself or some information derived from the digital image) and generates one or more geometry-aware buffer channels based on the analysis. For instance, in some cases, a buffer channel generation model generates one or more geometry-aware buffer channels for a digital image based on at least one height map generated for the digital image. Indeed, as indicated in FIG. 2B, the height-based shadowing system 106 utilizes the buffer channel generation model 234 to generate the geometry-aware buffer channels 236 based on the height maps 228. In some cases, a buffer channel generation model generates one or more additional or alternative geometry-aware buffer channels based on other data related to or extracted from a digital image, including, but not limited to, distances corresponding to pixels in the digital image, pixel heights of the pixels in the digital image, or a cutout of portions of the digital image.

In some instances, a buffer channel generation model implements a plurality of models or algorithms. For instance, in some implementations, a buffer channel generation model implements at least one model or algorithm for generating a particular geometry-aware buffer channel that is different than the model or algorithm used to generate at least one other geometry-aware buffer channel.

In one or more embodiments, a geometry-aware buffer channel includes a data channel having information about the contents of a digital image. In particular, in some embodiments, a geometry-aware buffer channel includes a data channel that provides spatial information regarding the contents of a digital image, whether by itself or combined with at least one other geometry-aware buffer channel. Indeed, in some embodiments, a geometry-aware buffer channel includes information regarding the space or geometry of a digital image and/or a three-dimensional environment portrayed within the digital image. While the height-based shadowing system 106 utilizes various geometry-aware buffer channels in different embodiments, exemplary geometry-aware buffer channels will be provided below with reference to FIGS. 4-7. Though the above suggests that a geometry-aware buffer channel includes a single channel, a geometry-aware buffer channel includes multiple channels of data in some implementations.

Additionally, as shown in FIG. 2B, the height-based shadowing system 106 utilizes the buffer channel generation model 234 to generate the geometry-aware buffer channels 236 further based on light source information 238 associated with the digital image 220. In one or more embodiments, the light source information 238 represents the lighting conditions associated with the digital image 220. For instance, in some cases, the light source information 238 includes a positioning of the light source of the digital image 220 (whether the light source is portrayed within the digital image or is positioned outside the scene portrayed within the digital image). In some instances, the light source includes a point light source or an area light source (e.g., a disk-shaped area light source). In some implementations, the light source information 238 further includes information, such as the position of a horizon within the digital image 220.

As illustrated in FIG. 2B, the height-based shadowing system 106 receives the light source information 238 from user input via a computing device, such as a client device 240. In some implementations, however, the height-based shadowing system 106 determines the light source information 238 by analyzing the digital image 220. For instance, in some cases, the height-based shadowing system 106 identifies a light source within the digital image 220 and determines a position of the light source by determining a coordinate of the light source in accordance with a coordinate scheme associated with the digital image 220.

As further illustrated by FIG. 2B, the height-based shadowing system 106 utilizes a shadow stylization neural network 242 to generate a soft object shadow 244 for the digital object 224 of the digital image 220 based on the geometry-aware buffer channels 236. In one or more embodiments, a shadow stylization neural network includes a computer-implemented neural network that generates soft object shadows for digital objects portrayed in a digital image. For instance, in some embodiments, a shadow stylization neural network includes a neural network that analyzes one or more geometry-aware buffer channels corresponding to a digital image portraying a digital object and generates a soft object shadow for the digital object based on the analysis. In some implementations, a shadow stylization neural network generates a soft object shadow for a digital object by modifying a hard object shadow generated for the digital object. More detail regarding the learning, implementation, and architecture of a shadow stylization neural network used by the height-based shadowing system 106 in some cases will be discussed below with reference to FIG. 4.

Additionally, as shown, the height-based shadowing system 106 utilizes the shadow stylization neural network 242 to generate the soft object shadow 244 further based on a softness value 246. In one or more embodiments, the height-based shadowing system 106 determines the softness value 246 via user input, such as by receiving the softness value 246 from the client device 240. In some implementations, the height-based shadowing system 106 utilizes a pre-determined softness value, a default softness value, or a softness value determined from user preferences or other user interactions with the client device 240.

As illustrated by FIG. 2B, the height-based shadowing system 106 modifies the digital image 220 to include the soft object shadow 244. For example, in some cases, the height-based shadowing system 106 modifies pixels of the digital image 220 to become shadow pixels in accordance with the soft object shadow 244. Though FIG. 2B indicates that generating the soft object shadow 244 and modifying the digital image 220 involve separate processes, the height-based shadowing system 106 performs these processes together in some implementations. Indeed, in some cases, the height-based shadowing system 106 modifies the digital image 220 by creating the soft object shadow 244 within the digital image 220.

By utilizing geometry-aware buffer channels to generate soft object shadows for digital objects portrayed in digital images, the height-based shadowing system 106 generalizes the shadow rendering process. In particular, the height-based shadowing system 106 generates soft object shadows using data channels that provide guidance on the shapes, geometries, and/or environments of the contents of digital images. As such, the height-based shadowing system 106 generates object shadows for a more robust set of shadow receivers when compared to conventional systems, which are typically limited to planar surfaces.

Figure 3A:
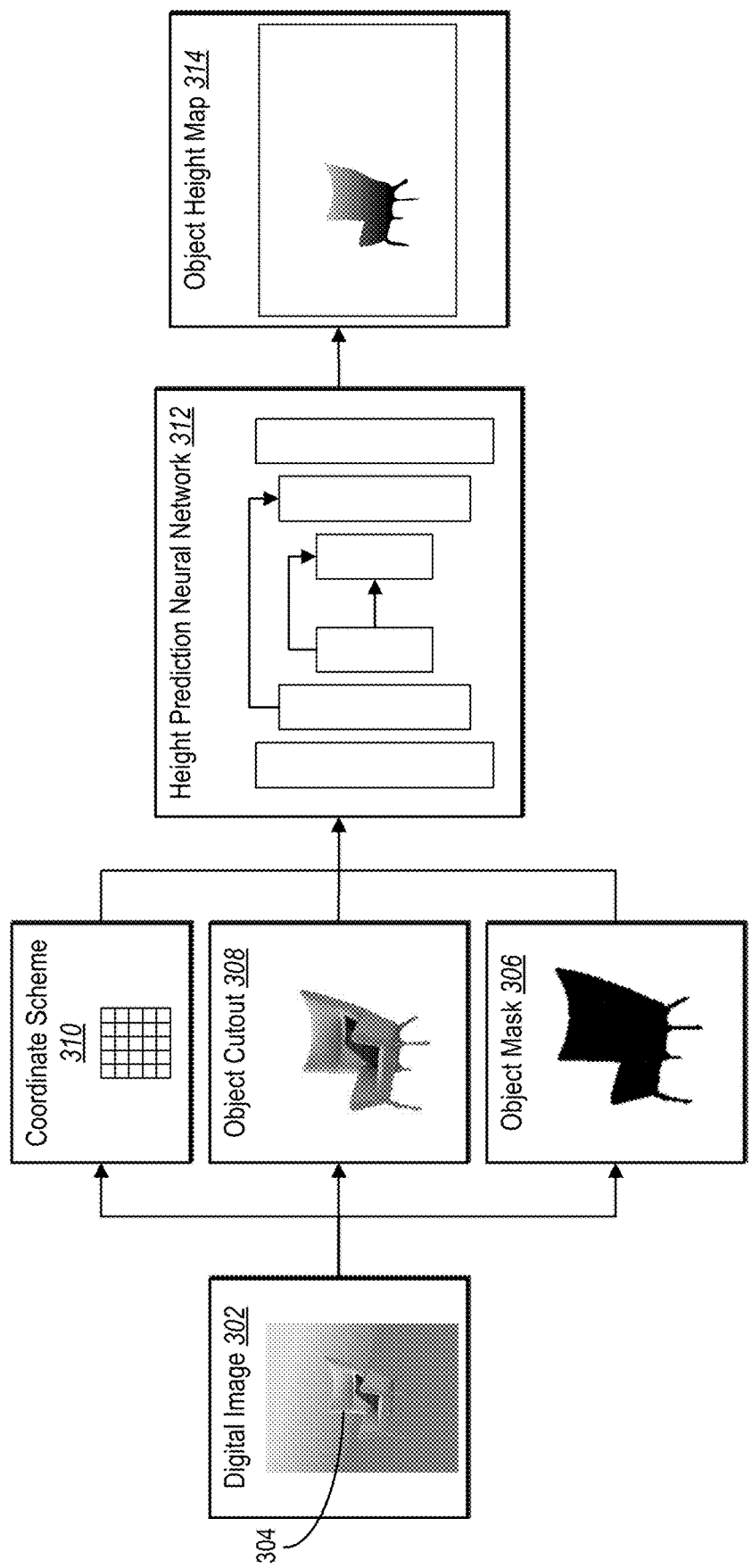
FIG. 3A illustrates a diagram for using a height prediction neural network to generate an object height map for a digital object portrayed in a digital image in accordance with one or more embodiments.

As previously mentioned, in one or more embodiments, the height-based shadowing system 106 utilizes a height prediction neural network to generate an object height map for a digital object portrayed in a digital image. FIG. 3A illustrates a diagram for using a height prediction neural network to generate an object height map for a digital object portrayed in a digital image in accordance with one or more embodiments.

As shown in FIG. 3A, the height-based shadowing system 106 determines various components that correspond to a digital image 302 that portrays a digital object 304 for use in generating an object height map 314 for the digital object 304. For instance, as illustrated in FIG. 3A, the height-based shadowing system 106 extracts an object mask 306 corresponding to the digital object 304 from the digital image 302. For example, in one or more embodiments, the height-based shadowing system 106 extracts the object mask 306 from the digital image 302 utilizing a segmentation model described in U.S. patent application Ser. No. 16/988,408 filed on Aug. 7, 2020, entitled GENERATING REFINED SEGMENTATION MASKS BASED ON UNCERTAIN PIXELS or the segmentation model described in U.S. patent application Ser. No. 17/200,525 filed on Mar. 12, 2021, entitled GENERATING REFINED SEGMENTATION MASKS VIA METICULOUS OBJECT SEGMENTATION, both of which are incorporated herein by reference in their entirety.

As further shown in FIG. 3A, the height-based shadowing system 106 determines an object cutout 308 for the digital object 304. In one or more embodiments, the height-based shadowing system 106 determines the object cutout 308 by applying the object mask 306 to the digital image 302. In some cases, the height-based shadowing system 106 receives the object cutout 308 via user input. For example, in at least one implementation, the height-based shadowing system 106 receives the object cutout 308 from a client device that extracts the object cutout 308 from the digital image 302 via user interactions with a snipping tool.

Additionally, as shown, the height-based shadowing system 106 determines a coordinate scheme 310 for the digital image 302. In one or more embodiments, a coordinate scheme includes a standard of coordinate points associated with a digital image. In particular, in some embodiments, a coordinate scheme includes a map of pixels of a digital image to coordinate points. In one or more embodiments, a coordinate scheme establishes an origin point at one of the corners of the digital image, at a center of the digital image, or at another portion of the digital image. In some cases, a coordinate scheme includes a two-dimensional coordinate scheme that is associated with a two-dimensional digital image. In some implementations, a coordinate scheme includes an indication of a y-axis associated with a digital image (e.g., orientation of the y-axis and/or direction of increasing/decreasing value for the y-axis).

In some cases, the height-based shadowing system 106 utilizes, as the coordinate scheme 310, a default or pre-determined coordinate scheme. In some implementations, the height-based shadowing system 106 determines the coordinate scheme 310 based on user input (e.g., received from a client device) or pre-configured user preferences.

As illustrated by FIG. 3A, the height-based shadowing system 106 utilizes a height prediction neural network 312 to generate the object height map 314. In one or more embodiments, the height prediction neural network 312 includes a neural network having an encoder-decoder neural network architecture. To illustrate, in some embodiments, the height prediction neural network 312 utilizes an encoder to encode the neural network inputs (e.g., the object mask 306, the object cutout 308, and the coordinate scheme 310) and utilizes the decoder to generate a neural network output (e.g., the object height map 314) from the encoded inputs. In some implementations, the height prediction neural network 312 further includes one or more skip links with each skip link providing the output of at least one layer of the encoder (e.g., an internal layer) to at least one layer of the decoder.

Figure 3B:
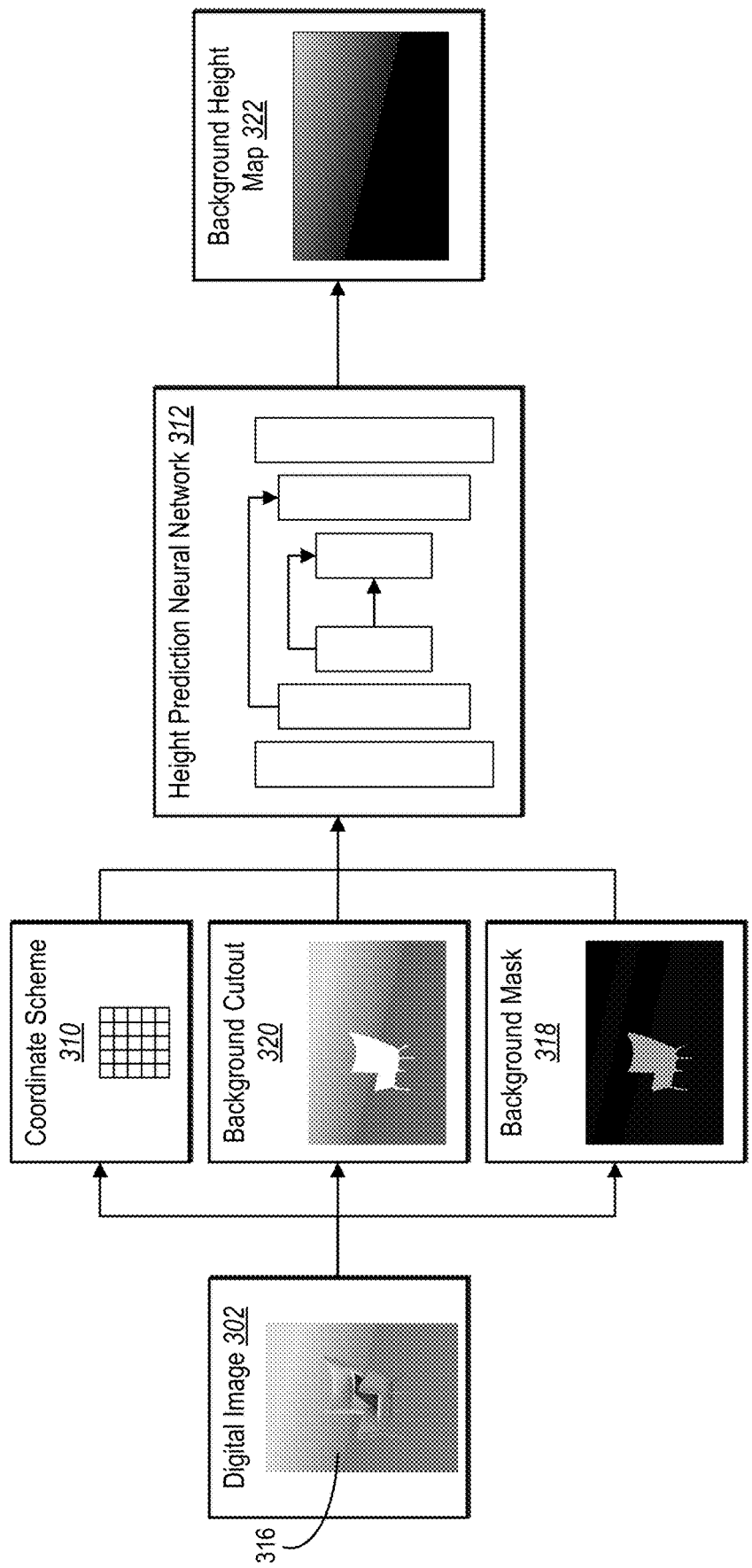
FIG. 3B illustrates a diagram for using a height prediction neural network to generate a background height map for a background portrayed in a digital image in accordance with one or more embodiments.

Similarly, as mentioned, in one or more embodiments, the height-based shadowing system 106 utilizes a height prediction neural network to generate a background height map for a background portrayed in a digital image. FIG. 3B illustrates a diagram for using a height prediction neural network to generate a background height map for a background portrayed in a digital image in accordance with one or more embodiments.

As shown in FIG. 3B, similar to generating the object height map 314 as discussed above with reference to FIG. 3A, the height-based shadowing system 106 determines various components that correspond to the background 316 of the digital image 302 for use in generating a background height map 322 for the background 316. For instance, as illustrated in FIG. 3B, the height-based shadowing system 106 generates a background mask 318 corresponding to the background 316 from the digital image 302. In one or more embodiments, the height-based shadowing system 106 generates the background mask 318 by extracting the background mask 318 directly from the digital image 302. In some cases, the height-based shadowing system 106 generates the background mask 318 by inverting the object mask 306 extracted from the digital image 302. As further shown in FIG. 3B, the height-based shadowing system 106 determines a background cutout 320 for the background 316.

As further shown, the height-based shadowing system 106 determines the coordinate scheme 310 for the digital image 302. Indeed, in one or more embodiments, the height-based shadowing system 106 utilizes the coordinate scheme 310 to generate the object height map 314 as well as the background height map 322. In some implementations, however, the height-based shadowing system 106 utilizes a different coordinate scheme to generate the background height map 322. Additionally, as illustrated by FIG. 3B, the height-based shadowing system 106 utilizes the height prediction neural network 312 to generate the background height map 322 from the background mask 318, the background cutout 320, and the coordinate scheme 310.

Figure 3C:
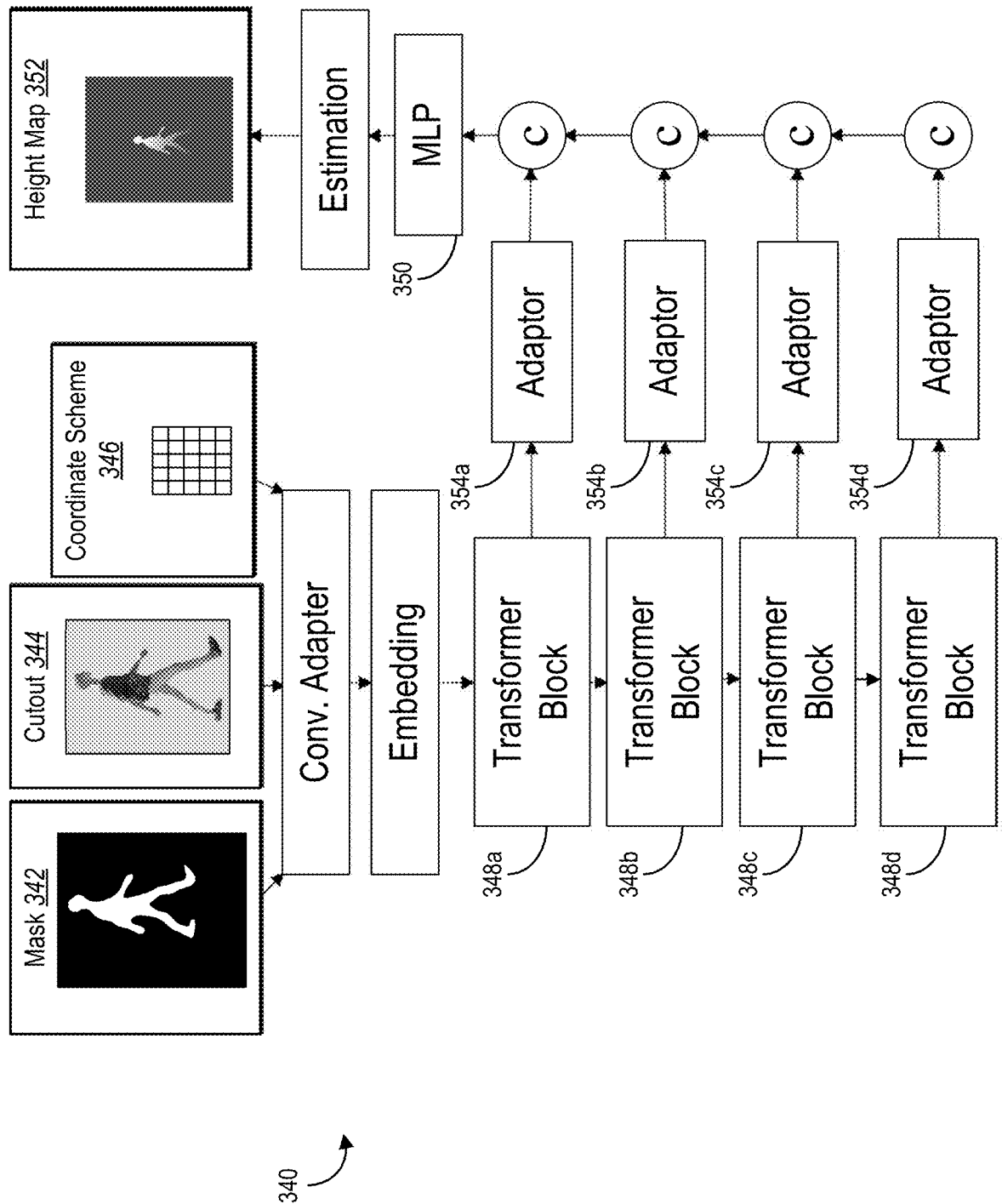
FIG. 3C illustrates an architecture of a height prediction neural network that generates height maps for digital images in accordance with one or more embodiments.

FIG. 3C illustrates an architecture of a height prediction neural network 340 used by the height-based shadowing system 106 for generating height maps for digital objects and backgrounds portrayed in digital images in accordance with one or more embodiments. As previously mentioned, and as shown in FIG. 3C, the height-based shadowing system 106 provides a mask 342 (e.g., an object mask or a background mask), a cutout 344 (e.g., an object cutout or a background cutout), and a coordinate scheme 346 as input to the height prediction neural network 340. For instance, in some cases, the height-based shadowing system 106 combines (e.g., concatenates) the mask 342, the cutout 344, and the coordinate scheme 346 and provides the combination to the height prediction neural network 340. In some cases, the height-based shadowing system 106 normalizes the coordinate scheme 346 by setting the lowest point in the mask 342 to be zero.

As shown in FIG. 3C, the height prediction neural network 340 includes a transformer backbone consisting of transformer blocks 348a-348d. Though a particular number of transformer blocks are shown, the height prediction neural network 340 includes various numbers of transformer blocks in different embodiments. The height prediction neural network 340 encodes the combination of the mask 342, the cutout 344, and the coordinate scheme 346 and generates or extracts features from the combination. More specifically, as shown, the height prediction neural network 340 generates features at different scales using the various transformer blocks. In one or more embodiments, a feature includes a characteristic extracted from an input (e.g., image or concatenation of an image with other inputs) by a neural network. For example, in some cases, features include deep or latent characteristics that are not readily comprehensible by a human or patent features that are visibly observable. In some embodiments, a feature map includes a collection of one or more features. For instance, in some cases, a feature map includes a grid, a matrix, a vector, or a different multi-dimensional collection of features. In addition, in some instances, a feature map includes positions or places for individual feature values that make up a feature map. For example, in some case, a feature map includes feature values corresponding to pixels of a digital image such that the feature map represents the digital image in feature-value form.

As further shown in FIG. 3C, the height prediction neural network 340 includes a multi-level decoder 350. The height prediction neural network 340 utilizes the multi-level decoder 350 to merge features from different scales. For example, in one or more implementations, each transformer block generates a feature map at a given scale (i.e., size). In one or more implementations, the feature maps are progressively smaller in scale and more abstract or latent. In some cases, the adaptors 354a-354d rescale the feature maps to a common size to allow for concatenation. The concatenated feature maps are decoded by the multi-level decoder 350 to generate the height map 352.

In one or more implementations, the use of the mask 342 allows the height prediction neural network 340 to encode only the portion of the image including the object or background for which the height map is to be generated. In other words, the use of the mask 342 allows the height prediction neural network 340 to efficiently generate the height map by ignoring other portions of the image. Thus, the height-based shadowing system 106 generates a height map for a digital object and/or background portrayed in a digital image. In particular, in some embodiments, the height-based shadowing system 106 utilizes a height prediction neural network to generate the height map(s).

Figure 3D:
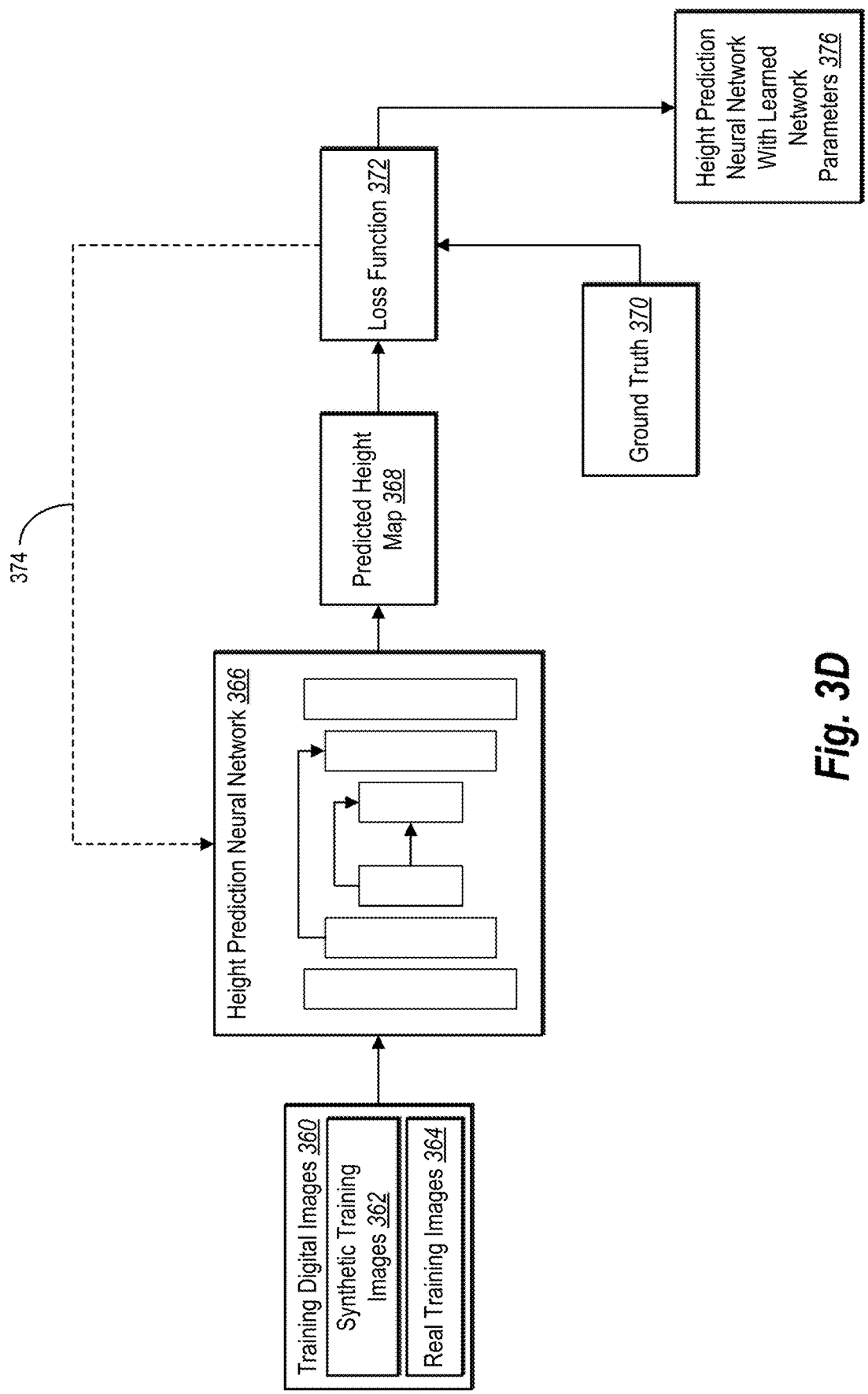
FIG. 3D illustrates a diagram for generating a height prediction neural network to generate height maps in accordance with one or more embodiments.

In one or more embodiments, the height-based shadowing system 106 generates (e.g., trains) a height prediction neural network to generate height maps for digital objects and/or backgrounds portrayed in digital images. FIG. 3D illustrates a diagram for generating a height prediction neural network to generate height maps in accordance with one or more embodiments.

Indeed, as shown in FIG. 3D, the height-based shadowing system 106 utilizes training digital images 360 for generating a height prediction neural network 366. In particular, as shown in FIG. 3D, the training digital images 360 include synthetic training images 362 and real training images 364. In one or more embodiments, the synthetic training images 362 include computer-generated digital images. For instance, in some cases, the synthetic training images 362 include computer-generated three-dimensional models of digital objects and/or backgrounds. In some cases, the synthetic training images 362 include various poses for each of the generated three-dimensional models. For each pose of a three-dimensional model, the synthetic training images 362 include images captured from different angles. In some implementations, the real training images 364 includes photographs (e.g., digital photographs).

As illustrated in FIG. 3D, the height-based shadowing system 106 utilizes the height prediction neural network 366 to analyze a training digital image from the training digital images 360 (e.g., one of the synthetic training images 362 or the real training images 364) and generate a predicted height map 368 based on the analysis. Further, the height-based shadowing system 106 compares the predicted height map 368 to a ground truth 370 via a loss function 372.

In one or more embodiments, the ground truths corresponding to the synthetic training images 362 include the pixel heights of the three-dimensional models of the digital objects and/or the backgrounds depicted in the synthetic training images 362. For instance, in some cases, the ground truths corresponding to the synthetic training images 362 include masks corresponding to two-dimensional images captured from the posed three-dimensional models and the pixel heights for the pixels represented within the masks.

Further, in some embodiments, the ground truths corresponding to the real training images 364 include one or more annotations for the digital objects and/or the backgrounds depicted in the real training images 364. To illustrate, in one or more embodiments, the ground truth corresponding to each real training image includes one or more labels (e.g., annotations) provided via user interaction, where a label includes a line drawn from a point of a digital object or background portrayed in the real training image to a point on the ground surface portrayed in the real training image. In particular, in some cases, each label shows the projection of a point from the digital object or background to the ground surface. In one or more embodiments, the ground truth corresponding to each real training image further includes a measurement of the length of each line (e.g., the pixel height corresponding to the drawn line). In some cases, the ground truths further include dense pixel heights maps for the digital objects and/or the backgrounds determined via bi-linear interpolation using the annotations.

In one or more embodiments, the height-based shadowing system 106 compares the predicted height map 368 to the ground truth 370 to determine a loss (i.e., an error) of the height prediction neural network 366. In some embodiments, where the ground truth 370 corresponds to a real training image, the height-based shadowing system 106 determines the loss corresponding to the one or more labels showing a projection of a point of the portrayed digital object or background to the ground surface.

As shown in FIG. 3D, the height-based shadowing system 106 back propagates the determined loss to the height prediction neural network 366 (as shown by the dashed line 374) to update the parameters of the height prediction neural network 366. In particular, the height-based shadowing system 106 updates the parameters to minimize the error of the height prediction neural network 366 in generating height maps for digital objects and/or backgrounds portrayed in digital images.

Though FIG. 3D illustrates generating the height prediction neural network 366 using one refinement iteration, it should be noted that, in some embodiments, the height-based shadowing system 106 generates the height prediction neural network 366 using multiple refinement iterations. In one or more embodiments, with each iteration of refinement, the height-based shadowing system 106 gradually improves the accuracy with which the height prediction neural network 366 generates height maps for digital objects and/or backgrounds. Thus, the height-based shadowing system 106 generates the height prediction neural network with learned network parameters 376.

Indeed, as shown in FIG. 3D, the height-based shadowing system 106 generates a height prediction neural network using synthetic training images and real training images. In some cases, however, the height-based shadowing system 106 generates the height prediction neural network using only synthetic training images or only real training images. In some implementations, generating a height prediction neural network from both synthetic training images and real training images improves the ability of the height prediction neural network to generate height maps. For instance, in some cases, using synthetic training images and real training images reduces the artifacts present in the height maps that are generated by the height prediction neural network.

Figure 4:
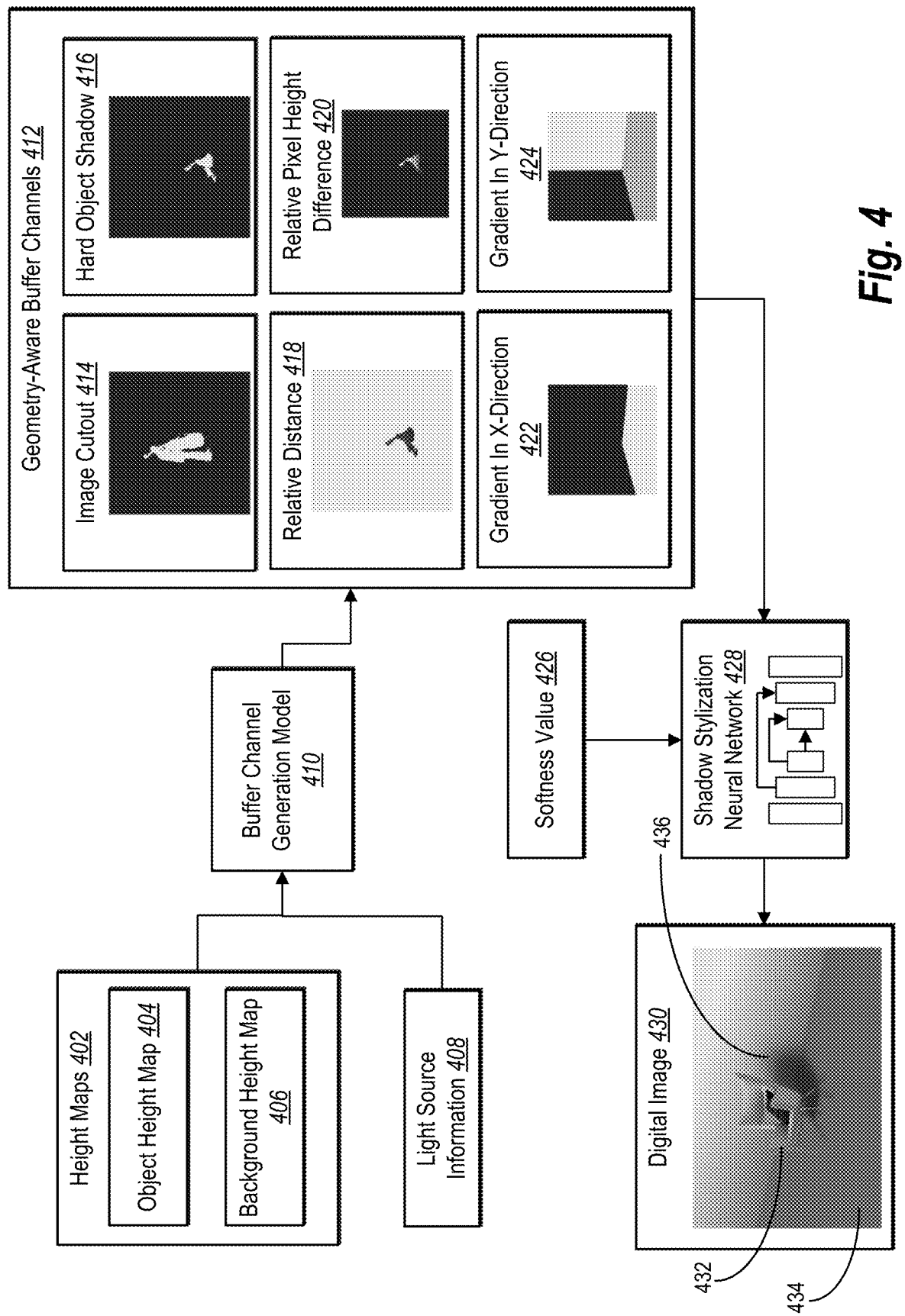
FIG. 4 illustrates generating a soft object shadow for a digital object within a digital image using geometry-aware buffer channels in accordance with one or more embodiments.

As further mentioned, in one or more embodiments, the height-based shadowing system 106 generates a soft object shadow for a digital object within a digital image using one or more geometry-aware buffer channels. FIG. 4 illustrates generating a soft object shadow for a digital object within a digital image using geometry-aware buffer channels in accordance with one or more embodiments.

As shown in FIG. 4, and as discussed above, the height-based shadowing system 106 provides height maps 402 (e.g., an object height map 404 and a background height map 406) and light source information 408 corresponding to a digital image 430 to a buffer channel generation model 410. The height-based shadowing system 106 utilizes the buffer channel generation model 410 to generate geometry-aware buffer channels 412 based on this information.

The geometry-aware buffer channels 412 include various channels providing different information regarding the digital image 430. For instance, the geometry-aware buffer channel 414 includes an image cutout. In particular, as shown, the geometry-aware buffer channel 414 includes an object cutout corresponding to the digital object 432 portrayed in the digital image 430. In one or more embodiments, the height-based shadowing system 106 utilizes the geometry-aware buffer channel 414 having the object cutout to provide guidance with respect to the shape of the digital object 432. Though not shown, in some cases, the height-based shadowing system 106 additionally or alternatively utilizes a background cutout corresponding to a background 434 of the digital image 430 as a geometry-aware buffer channel.

The geometry-aware buffer channel 416 includes a hard object shadow generated for the digital object 432. Indeed, in one or more embodiments, the height-based shadowing system 106 generates a hard object shadow that represents a shadow cast by the digital object 432 within the digital image 430. In some cases, as will be discussed with reference to FIG. 5, the height-based shadowing system 106 utilizes at least one of the height maps 402 in generating the hard object shadow. As previously suggested, the height-based shadowing system 106 utilizes a shadow stylization neural network to modify the hard object shadow included in the geometry-aware buffer channel 416 in generating a soft object shadow for the digital object 432 in some cases.

As shown, the geometry-aware buffer channel 418 includes the relative distances corresponding to pixels of the digital image 430. In particular, in some embodiments, the geometry-aware buffer channel 418 includes a plurality of relative distances, where each relative distance corresponds to a pair of pixels. For instance, in some embodiments, a relative distance provides a distance (e.g., as measured in pixels) corresponding to a pixel of the background 434 of the digital image 430 and a pixel of the digital object 432. To illustrate, in some implementations, a relative distance provides a distance (e.g., as measured in pixels) corresponding to a pixel of the background 434 and a pixel of the digital object 432 that is blocking the pixel of the background 434 from receiving light from a light source. In other words, in some cases, the height-based shadowing system 106 determines a relative distance for a background pixel and an object pixel that projects a shadow onto the background pixel. Determining a relative distance for a pair of pixels will be discussed in more detail below with reference to FIG. 6.

As further shown, the geometry-aware buffer channel 420 includes relative pixel height differences corresponding to pixels of the digital image 430. In particular, in some embodiments, the geometry-aware buffer channel 420 includes a plurality of relative pixel height difference, where each relative pixel height difference corresponds to a pair of pixels. For instance, in some embodiments, a relative pixel height difference provides a difference in pixel height corresponding to a pixel of the background 434 and a pixel of the digital object 432. To illustrate, in some implementations, a relative pixel height difference provides a difference in pixel height corresponding to a pixel of the background 434 and a pixel of the digital object 432 that is blocking the pixel of the background 434 from receiving light from a light source. In other words, in some cases, the height-based shadowing system 106 determines a relative pixel height difference for a background pixel and an object pixel that projects a shadow onto the background pixel. Determining a relative pixel height difference for a pair of pixels will be discussed in more detail below with reference to FIG. 6.

Additionally, as illustrated in FIG. 4, the geometry-aware buffer channel 422 and the geometry-aware buffer channel 424 each include a gradient of the background height map 406 generated for the digital image 430. In particular, the geometry-aware buffer channel 422 includes a gradient in a first direction, and the geometry-aware buffer channel 424 includes a gradient in a second direction. Indeed, as shown in FIG. 4, the geometry-aware buffer channel 422 includes a gradient in the x-direction, and the geometry-aware buffer channel 424 includes a gradient in the y-direction. In some implementations, the height-based shadowing system 106 utilizes gradients in additional or alternative directions (e.g., a diagonal direction). In one or more embodiments, by including the geometry-aware buffer channel 422 and/or the geometry-aware buffer channel 424, the geometry-aware buffer channels 412 are translation invariant. In other words, in some implementations, the height-based shadowing system 106 is capable of using the geometry-aware buffer channels 412 to create a soft object shadow for the digital object 432 despite a translation of the digital object 432 within the digital image 430. For instance, in some cases, a geometry-aware buffer channel including a gradient of a background height map captures the surface orientation similar to a normal map.

As suggested, FIG. 4 illustrates a particular set of geometry-aware buffer channels, though the height-based shadowing system 106 generates additional or alternative geometry-aware buffer channels in various embodiments. Further, in some embodiments, the height-based shadowing system 106 generates more or fewer geometry-aware buffer channels in some implementations. For instance, in some embodiments, the height-based shadowing system 106 generates a subset of the geometry-aware buffer channels that are shown for use in generating a soft object shadow.

As shown in FIG. 4, the height-based shadowing system 106 provides the geometry-aware buffer channels 412 to a shadow stylization neural network 428 for generating a soft object shadow 436 within the digital image 430. In one or more embodiments, the shadow stylization neural network 428 includes a neural network having an encoder-decoder neural network architecture. To illustrate, in some embodiments, the shadow stylization neural network 428 utilizes an encoder to encode the neural network inputs (e.g., the geometry-aware buffer channels 412) and utilizes a decoder to generate a neural network output (e.g., the soft object shadow 436 or the digital image 430 modified to include the soft object shadow 436). In some implementations, the shadow stylization neural network 428 further includes one or more skip links with each skip link providing the output of at least one layer of the encoder to at least one layer of the decoder.

Additionally, as shown in FIG. 4, the height-based shadowing system 106 provides a softness value 426 to the shadow stylization neural network 428 for generating the soft object shadow 436. In one or more embodiments, a softness value includes a value or set of values (e.g., a vector of values) that quantifies the softness of an object shadow, such as a soft object shadow. In some cases, a baseline softness value (e.g., a softness value of zero) is associated with a hard shadow object, a softness value above the baseline softness value is associated with a soft object shadow, and a relatively higher softness value is associated with a higher degree of softness for a soft object shadow. In some cases, the height-based shadowing system 106 generates a soft object shadow having a certain degree of softness based on a softness value.

In one or more embodiments, the height-based shadowing system 106 determines the softness value 426 from user input. For instance, in some cases, the height-based shadowing system 106 receives the softness value 426 from a client device. In some cases, the height-based shadowing system 106 otherwise determines the softness value 426 based on user input received from the client device (e.g., based on user interactions with a softness control provided within a graphical user interface displayed on the client device). In some implementations, the height-based shadowing system 106 utilizes a pre-determined softness value, a default softness value, or a softness value determined from user preferences.

In one or more embodiments, the height-based shadowing system 106 provides the softness value 426 to the shadow stylization neural network 428 by providing the softness value 426 to one or more of the decoder layers. To illustrate, in some implementations, the height-based shadowing system 106 defines the softness value 426 as a two-dimensional feature map (e.g., a two-dimensional vector that indicates the softness of the object shadow for each shadow pixel associated with the object shadow). Further, the height-based shadowing system 106 concatenates the two-dimensional feature map with the input (or output) of one or more layers of the decoder of the shadow stylization neural network 428, such as one or more of the initial layers of the decoder. Accordingly, in some cases, the layers of the decoder analyze the softness information from the softness value 426 as it generates the soft object shadow 436.

In one or more embodiments, the height-based shadowing system 106 generates (e.g., trains) the shadow stylization neural network 428 for use in generating soft object shadows for digital objects. In some cases, the height-based shadowing system 106 generates the shadow stylization neural network 428 by utilizing multiple refinement iterations to refine its parameters and improve its accuracy in generating soft object shadows. To illustrate, in some cases, the height-based shadowing system 106 utilizes the shadow stylization neural network 428 to analyze one or more training geometry-aware buffer channels for a given refinement iteration. Further, the height-based shadowing system 106 provides a training softness value to the shadow stylization neural network 428. Accordingly, the height-based shadowing system 106 utilizes the shadow stylization neural network 428 to generate a predicted soft object shadow, compares the predicted soft object shadow to a ground truth via a loss function, and back propagates the determined loss to the shadow stylization neural network 428 to update its parameters.

In some cases, the height-based shadowing system 106 utilizes synthetic images to generate the shadow stylization neural network 428. In particular, the height-based shadowing system 106 utilizes training geometry-aware buffer channels generated from synthetic training images. In some cases, the height-based shadowing system 106 utilizes real images or a combination of synthetic and real images to generate the shadow stylization neural network 428. To illustrate, in some embodiments, the height-based shadowing system 106 utilizes synthetic images composed of three-dimensional models as the training images and further utilizes a physics-based shadow rendering model to generate soft object shadows from the three-dimensional models for use as the corresponding ground truths. For instance, in some cases, the height-based shadowing system 106 utilizes the physics-based rendering model described in PBR Render, https://substance3d.adobe.com/documentation/sddoc/pbr-render-194216472.html, 2021, the entire contents of which are hereby incorporated by reference in their entirety.

In one or more embodiments, the height-based shadowing system 106 generates the shadow stylization neural network 428 simultaneously with the height prediction neural network. In some cases, however, the height-based shadowing system 106 generates each neural network via a separate process.

Thus, as shown in FIG. 4, the height-based shadowing system 106 generates the soft object shadow 436 within the digital image 430. In particular, in some cases, the height-based shadowing system 106 modifies the digital image 430 to portray the digital object 432 casting the soft object shadow 436 across the background 434.

By using geometry-aware buffer channels, the height-based shadowing system 106 operates more flexible when compared to conventional systems as it generates soft object shadows for a more robust set of shadow receivers, including those shadow receivers having non-planar surfaces. As such, the height-based shadowing system 106 further operates more accurately when compared to conventional systems. Indeed, by implementing a hard shadow rendering approach that accommodates non-planar backgrounds, the height-based shadowing system 106 generates soft object shadows that more accurately represent the shadow projection of a digital object across such backgrounds. Thus, the resulting digital images provide a more natural, realistic appearance.

Figure 5:
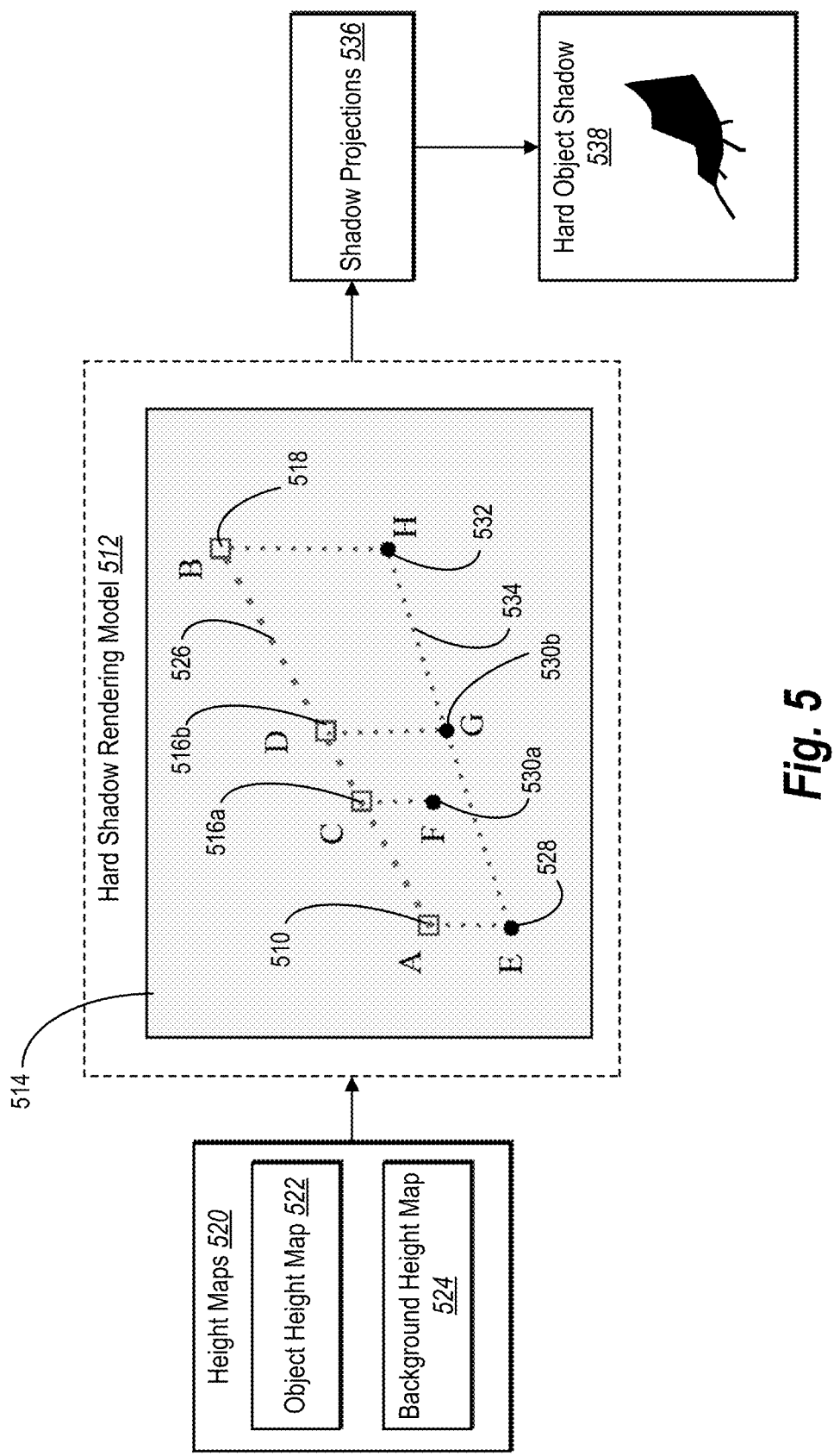
FIG. 5 illustrates a diagram for generating a geometry-aware buffer channel that includes a hard object shadow for a digital object portrayed in a digital image in accordance with one or more embodiments.

FIG. 5 illustrates a diagram for generating a geometry-aware buffer channel that includes a hard object shadow for a digital object portrayed in a digital image in accordance with one or more embodiments. In particular, FIG. 5 illustrates the height-based shadowing system 106 determining shadow projections 536 for a digital image (e.g., the shadow projections of the pixels of a digital object portrayed in the digital image) utilizing a hard shadow rendering model 512.

In one or more embodiments, a hard shadow rendering model includes a computer-implemented model or algorithm that generates a hard object shadow for a digital object portrayed in a digital image. In particular, in some embodiments, a hard shadow rendering model includes a computer-implemented model that determines shadow projections of pixels of a digital object portrayed in a digital image and generates a hard object shadow based on those shadow projections. For instance, in some embodiments, a hard shadow rendering model determines, for a given pixel, a corresponding shadow projection. In some cases, the hard shadow rendering model determines a shadow projection of a pixel by determining a position of a corresponding shadow pixel.

In one or more embodiments, a shadow projection includes a projection of a shadow of one portion of a digital image onto another portion of a digital image based on lighting conditions associated with the digital image. For instance, in some cases, a shadow projection includes a projection of a shadow of a digital object (i.e., an object shadow) across one or more surfaces of a digital image due to associated lighting conditions. In some implementations, a shadow projection more specifically refers to the projection of a shadow of an individual pixel. Thus, in some cases, a collection of shadow projections for individual pixels (e.g., pixels of a digital object) correspond to an object shadow of a digital object. In some cases, a shadow projection includes a location of the object shadow corresponding to a digital object (e.g., the locations for its individual shadow pixels). In some cases, a shadow projection includes one or more other qualities of an object shadow, such as its orientation, size, boundaries, etc. In some instances, the height-based shadowing system determines these other qualities based on the locations of the individual shadow pixels.

In one or more embodiments, a shadow pixel includes a pixel of a digital image associated with an object shadow. In particular, in some embodiments, a shadow pixel includes a pixel that portrays or contributes to the portrayal of an object shadow. As will be discussed below, in one or more embodiments, the height-based shadowing system 106 identifies, generates, or otherwise determines shadow pixels of an object shadow from a shadow projection of a corresponding digital object (e.g., from the shadow projections of the pixels of the digital object).

FIG. 5 illustrates the height-based shadowing system 106 utilizing the hard shadow rendering model 512 to determine whether a pixel 510 of the background of a digital image (represented as A) corresponds to an object shadow. Indeed, in one or more embodiments, a digital image having boundaries represented by the box 514 includes the pixel 510 of the background. In other words, the digital image portrays a background, and the pixel 510 corresponds to a portion of that background. Further, in some embodiments, the digital image portrays a digital object that includes at least pixels 516a-516b (represented as C and D, respectively).

Accordingly, in some implementations, the height-based shadowing system 106 determines whether the pixel 510 of the background corresponds to an object shadow for the digital object by determining whether the pixel 510 is blocked from receiving light from a light source 518 (represented as B) associated with the digital image (where the light source 518 includes a point light source). In particular, the height-based shadowing system 106 determines whether the digital object (e.g., at least one pixel of the digital object) is blocking the pixel 510 of the background from receiving the light.

In one or more embodiments, to determine whether the digital object is blocking the pixel 510 of the background from receiving light, the height-based shadowing system 106 identifies pixels of the digital object that are positioned between the pixel 510 of the background and the light source 518 for the digital image. To illustrate, as shown in FIG. 5, the height-based shadowing system 106 determines a line 526 between the pixel 510 of the background and the light source 518. The height-based shadowing system 106 further identifies pixels of the digital object that are positioned on the line 526 (including the pixel 516a and the pixel 516b). Thus, in some cases, the height-based shadowing system 106 determines whether at least one pixel of the digital object that is positioned on the line 526 is blocking light from reaching the pixel 510 of the background.

As shown in FIG. 5, the height-based shadowing system 106 utilizes height maps 520 to determine whether the pixel 510 of the background is blocked from receiving light from the light source 518. In particular, as shown, the height-based shadowing system 106 utilizes an object height map 522 generated for the digital object and a background height map 524 generated for the background portrayed within the digital image. In one or more embodiments, the height-based shadowing system 106 utilizes the height maps 520 by utilizing the pixel heights represented in the height maps 520 to determine the ground points corresponding to the pixels represented therein. Indeed, in some cases, the height-based shadowing system 106 uses the pixel height of a pixel as the distance from that pixel to the ground surface. Thus, the height-based shadowing system 106 determines that a ground point for a pixel is located a distance away from the pixel that is equal to the pixel height for the pixel.

In one or more embodiments, a ground point includes a point on a ground surface. In particular, in some embodiments, a ground point includes a point on a ground surface that corresponds to another point positioned on a surface other than the ground surface. For instance, in some cases, a ground point includes a projection of another point onto a ground surface. To illustrate further, in some implementations, a ground point includes a projection (e.g., a vertical projection) of a pixel onto a ground surface within an image space of a digital image.

Indeed, in one or more embodiments, a digital image portrays and image space. In one or more embodiments, an image space includes a space defined by a digital image. In particular, in some embodiments, an image space includes a space defined by the pixels of a digital image. For example, in some cases, the height-based shadowing system 106 determines the distance between two points of a digital image in its corresponding image space as the distance in pixels. Further, in some implementations, a digital image corresponds to a three-dimensional space Accordingly, in one or more embodiments, a digital image portrays a two-dimensional projection of a three-dimensional space captured within its corresponding image space—where the three-dimensional space represents a physical, real-world space (or a three-dimensional space generated by a computing device) or a re-creation of such a space.

To illustrate using the height maps 520, as shown in FIG. 5, the height-based shadowing system 106 determines a ground point 528 (represented as E) that corresponds to the pixel 510 of the background. For instance, in some cases, the height-based shadowing system 106 determines the ground point 528 utilizing the background height map 524. Similarly, as shown, the height-based shadowing system 106 determines a ground point 530a (represented as F) corresponding to the pixel 516a and a ground point 530b (represented as G) corresponding to the pixel 516b of the digital object, such as by using the object height map 522. Further, the height-based shadowing system 106 determines a ground point 532 (represented as H) corresponding to the light source 518 of the digital image.

As further illustrated in FIG. 5, the height-based shadowing system 106 determines a line 534 between the ground point 528 corresponding to the pixel 510 of the background and the ground point 532 corresponding to the light source 518. As suggested by FIG. 5, the line 534 is a projection of the line 526 onto the ground surface of the digital image.

As mentioned, in one or more embodiments, the height-based shadowing system 106 determines whether the pixel 510 of the background corresponds to the object shadow by determining whether at least one pixel of the digital object that is positioned on the line 526 is blocking light from reaching the pixel 510 of the background. In one or more embodiments, the height-based shadowing system 106 determines whether a pixel of the digital object positioned on the line 526 is blocking light from reaching the pixel 510 of the background by determining whether a pixel of the digital object positioned on the line 526 has a corresponding ground point that is positioned on the line 534.

For example, as shown in FIG. 5, the height-based shadowing system 106 determines that the ground point 530a corresponding to the pixel 516a is not positioned on the line 534. Accordingly, the height-based shadowing system 106 determines that the pixel 516a is not blocking light from reaching the pixel 510 of the background. As further shown, however, the height-based shadowing system 106 determines that the ground point 530b corresponding to the pixel 516b is positioned on the line 534. Thus, the height-based shadowing system 106 determines that the pixel 516b is blocking light from reaching the pixel 510 of the background, and the pixel 510 corresponds to (e.g., is part of) the object shadow of the digital object. In other words, the height-based shadowing system 106 determines that the pixel 510 of the background corresponds to a shadow projection of the pixel 516b of the digital object. In one or more embodiments, based on determining that the pixel 510 of the background corresponds to a shadow projection, the height-based shadowing system 106 modifies the pixel 510 to include a shadow pixel. In one or more embodiments, the height-based shadowing system 106 utilizes a tolerance value to determine whether a ground point corresponding to a pixel of the digital object is positioned on the line 534.

In one or more embodiments, the height-based shadowing system 106 similarly identifies one or more additional pixels of the background that correspond to the object shadow of the digital object. In some cases, the height-based shadowing system 106 analyzes each pixel of the background to determine whether that pixel corresponds to the object shadow. In some implementations, the height-based shadowing system 106 analyzes a subset of the pixels of the background (e.g., a subset that are relatively more likely to correspond to the object shadow, such as a subset of pixels of the background that are on an opposite side of the digital object than the light source 518).

Indeed, in one or more embodiments, for a given pixel of the background, the height-based shadowing system 106 determines a line between that pixel and the light source for the digital image. Additionally, the height-based shadowing system 106 identifies pixels of the digital object that are positioned on that line. The height-based shadowing system 106 further determines corresponding ground points for the pixel of the background, the identified pixel(s) of the digital object, and the light source (e.g., using the relevant height map). The height-based shadowing system 106 determines an additional line between the ground point of the pixel of the background and the ground point of the light source and determines whether at least one of the ground points of the pixels of the digital object are positioned on that additional line. If so, the height-based shadowing system 106 determines that the pixel of the background corresponds to a shadow projection of that pixel of the digital object and modifies that pixel of the background to include a shadow pixel. In some cases, upon determining that the pixel of the background does not correspond to a shadow projection of a pixel of the digital object, the height-based shadowing system 106 maintains an initial value of the pixel of the background (e.g., does not modify the pixel to include a shadow pixel).

In one or more embodiments, the height-based shadowing system 106 iterates through each pixel of the digital object positioned on the line between the pixel of the background and the light source to identify any of those pixels that are blocking the light. In some cases, the height-based shadowing system 106 stops iterating as soon as one light-blocking pixel of the digital object is identified.

Thus, as shown in FIG. 5, the height-based shadowing system 106 determines shadow projections 536 of the pixels of the digital object (e.g., a shadow projection of the digital object itself). Based on the shadow projections 536, the height-based shadowing system 106 generates a hard object shadow 538 for the digital object. In one or more embodiments, the height-based shadowing system 106 additionally or alternatively generates a hard shadow mask that corresponds to the hard object shadow 538 for the digital object.

The back tracing pixel height based hard shadow rendering (BT-PHSR) algorithm presented below represents another characterization of the height-based shadowing system 106 determining shadow projections of pixels of a digital object portrayed in a digital image for rendering a hard object shadow in accordance with one or more embodiments.

---

BT-PHSR Algorithm

---

Input: Shadow occluder pixel height map H, light position $l_{xy}$ and height $h_l$, shadow receiver pixel height map R
Output: Hard Shadow S
Initialize S with 1, $\epsilon$ with 1
h, w = height and width of H
for i = 0 to w do
  for j = 0 to h do
    $p_{ij}$ = (i, j)
    $h_r$ = R(i, j)
    for all p on the line $l_{xy} - p_{ij}$ do
      i', j' = p
      if H(i', j') does not have value, then
        Continue
      else
        h' = H(i', j')

---

BT-PHSR Algorithm

--- h = $(h_l - h_r) \cdot (p - p_{ij})/(l_{xy} - p_{ij})$
        if |h - h'| < $\epsilon$ then
          S(i, j) = 0
          Break
        end
      end
    end
  end
end

---

As indicated by the BT-PHSR algorithm, in one or more embodiments, the height-based shadowing system 106 analyzes pixels of the digital object (i.e., the shadow occluder) on the line between the light source and another pixel. Upon determining that the other pixel is blocked from receiving light, the height-based shadowing system 106 modifies the set of hard shadow pixels (represented as S) to include the other pixel.

By using the methods described above to analyze pixels of a digital image in an image space, the height-based shadowing system 106 determines whether pixels of the background receive light within a corresponding three-dimensional space. In particular, in some cases, by determining whether a ground point for a pixel of a digital object is positioned on a line connecting ground points for a pixel of the background and a light source within an image space, the height-based shadowing system 106 determines whether the corresponding portion of the digital object is directly between the corresponding portion of the background and the light source within the three-dimensional space. As mentioned, and as shown in FIG. 5 and the BT-PHSR algorithm, the height-based shadowing system 106 utilizes a background height map (i.e., the shadow receiver pixel height map R) and an object height map (i.e., the shadow occluder pixel height map H) in identifying the ground points used in determining whether a particular pixel has access to light. Thus, in one or more embodiments, the height-based shadowing system 106 utilizes height maps in generating a hard object shadow for a digital object.

In some embodiments, the height-based shadowing system 106 utilizes a single height map in generating a hard object shadow for a digital object portrayed in a digital image. For instance, in some cases, the height-based shadowing system 106 generates a hard object shadow using an object height map generated for the digital object. To illustrate, in one or more embodiments, the height-based shadowing system 106 generates a hard object shadow utilizing an object height map as described in U.S. patent application Ser. No. 17/502,782 filed on Oct. 15, 2021, entitled GENERATING SHADOWS FOR DIGITAL OBJECTS WITHIN DIGITAL IMAGES UTILIZING A HEIGHT MAP, which is incorporated herein by reference in its entirety.

Figure 6:
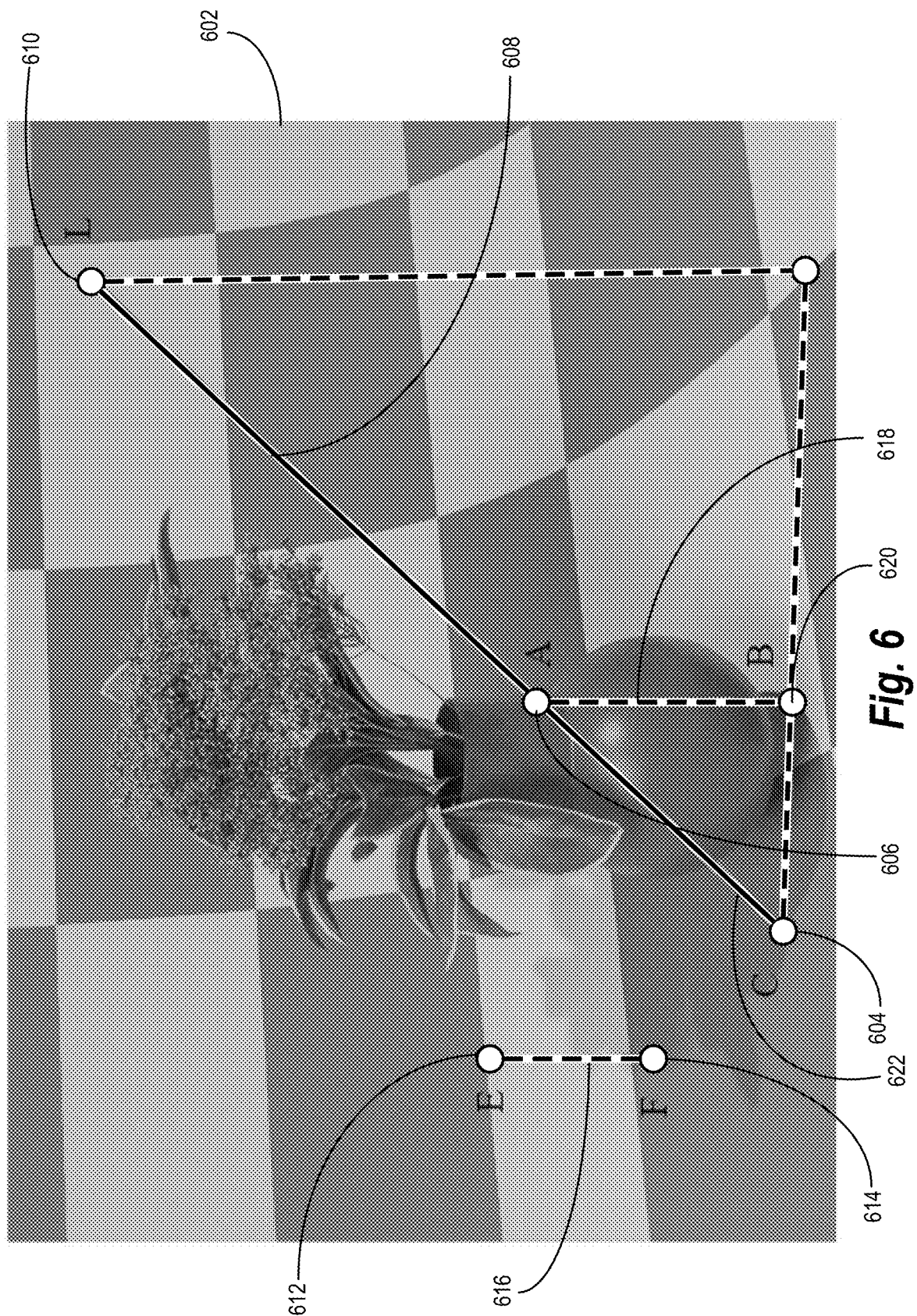
FIG. 6 illustrates a diagram for determining relative distances and relative pixel height differences for pixels in a digital image in accordance with one or more embodiments.

FIG. 6 illustrates a diagram for determining relative distances and relative pixel height differences for pixels in a digital image 602 in accordance with one or more embodiments. As shown in FIG. 6, the height-based shadowing system 106 identifies a pixel 604 of the background of the digital image 602 (represented as C) and a pixel 606 of the digital object (represented as A) that corresponds to the pixel 604 of the background. In some cases, the height-based shadowing system 106 determines that the pixel 606 of the digital object corresponds to the pixel 604 of the background by determining that the pixel 604 of the background corresponds to a shadow pixel resulting from a shadow projection of the pixel 606 of the digital object. Indeed, as shown in FIG. 6, the pixel 606 of the digital object is positioned on a line 608 between the pixel 604 of the background and the light source 610 for the digital image 602. In one or more embodiments, the height-based shadowing system 106 determines that the pixel 606 of the digital object blocks light from reaching the pixel 604 of the background as described above with reference to FIG. 5.

In one or more embodiments, the height-based shadowing system 106 determines the relative distances and/or the relative pixel height differences utilizing the pixels heights for the various pixels. Accordingly, in some embodiments, the height-based shadowing system 106 determines pixel heights for the pixels under consideration. As an example, FIG. 6 illustrates a pixel 612 of the background and a ground point 614 corresponding to the pixel 612 of the background. Thus, in some implementations, the height-based shadowing system 106 determines that the pixel height of the pixel 612 of the background is the distance between the pixel 612 and the ground point 614 (represented by the line 616). In one or more embodiments, the height-based shadowing system 106 utilizes an object height map and/or a background height map to determine the pixel heights for the pixels.

Thus, in some cases, to determine a relative pixel height difference for the pixel 604 and the pixel 606, the height-based shadowing system 106 determines a pixel height for the pixel 604 of the background. As indicated in FIG. 6, the pixel 604 is located on a ground surface of the digital image 602; therefore, the height-based shadowing system 106 determines that the pixel 604 has a pixel height of zero. Further, the height-based shadowing system 106 determines a pixel height for the pixel 606 of the digital object. The pixel height for the pixel 606 of the digital object is represented by the line 618 between the pixel 606 and the ground point 620 (represented as B) for the pixel 606. Based on determining that the pixel 604 of the background has a pixel height of zero, the height-based shadowing system 106 determines that the relative pixel height difference is also represented by the line 618 (indicating the height difference).

To generalize, in one or more embodiments, the height-based shadowing system 106 determines a relative pixel height difference between a pixel of the background and a corresponding pixel of the digital object by finding a first pixel height for the pixel of the background (e.g., using a background height map) and a second pixel height for the pixel of the digital object (e.g., using an object height map). The height-based shadowing system 106 further determines a height difference between the first pixel height and the second pixel height. Thus, the height-based shadowing system 106 determines relative pixel height differences for pairs of pixels regardless of the pixel heights of those pixels (e.g., whether the pixels are positioned on the ground surface or above the ground surface).

Thus, the height-based shadowing system 106 determines relative pixel height differences for pairs of pixels within the digital image 602. In some cases, the height-based shadowing system 106 assigns the relative pixel height differences to the pixel of the background from the pair of pixels. In other words, the height-based shadowing system 106 determines a relative pixel height difference for a pixel of the background using the pixel of the background and its corresponding pixel of the digital object. Thus, the height-based shadowing system 106 generates a geometry-aware buffer channel that reflects the relative pixel height differences for each of the represented pixels of the background. As suggested above, in some implementations, the height-based shadowing system 106 determines a relative pixel height difference for each pixel of the background that corresponds to an object shadow of the digital object.

Further, in one or more embodiments, to determine a relative distance for the pixel 604 and the pixel 606, the height-based shadowing system 106 determines a horizontal distance between the pixel 604 and the pixel 606. For example, as indicated in FIG. 6, the height-based shadowing system 106 determines the ground point 620 corresponding to the pixel 606 of the digital object. As the pixel 604 of the background is already located on the ground surface of the digital image 602, the height-based shadowing system 106 determines that the relative distance is the distance between the pixel 604 of the background and the ground point 620 for the pixel 606 of the digital object (represented by the line 618).

To generalize, in one or more embodiments, the height-based shadowing system 106 determines a relative distance between a pixel of the background and a pixel of the digital object by determining ground points corresponding to the pixels (unless a pixel is already positioned on the ground surface). In particular, the height-based shadowing system 106 utilizes the relevant height map to determine the ground point for a pixel (or to determine that a pixel is already positioned on the ground surface). The height-based shadowing system 106 determines the relative distance to include the distance between the ground points. In some cases, the height-based shadowing system 106 utilizes other points within the digital image to determine relative distance. For instance, in some implementations, the height-based shadowing system 106 identifies a point (or horizontal axis) within the digital image to use as a reference for determining relative distances. Thus, the height-based shadowing system 106 determines vertical projections of pixels onto this reference and determines the relative distances accordingly.

Thus, the height-based shadowing system 106 determines relative distances for pairs of pixels within the digital image 602. In some cases, the height-based shadowing system 106 assigns the relative distances to the pixel of the background from the pair of pixels. In other words, the height-based shadowing system 106 determines a relative distance for a pixel of the background using the pixel of the background and its corresponding pixel of the digital object. Thus, the height-based shadowing system 106 generates a geometry-aware buffer channel that reflects the relative distances for each of the represented pixels of the background. As suggested above, in some implementations, the height-based shadowing system 106 determines a relative distance for each pixel of the background that corresponds to an object shadow of the digital object.

While the above describes the relative distance as a horizontal distance that corresponds to a pair of pixels, in some implementations, the height-based shadowing system 106 utilizes different measures for relative distance. For instance, in some implementations, the height-based shadowing system 106 utilizes the distance represented by the line 622 between the pixel 604 of the background and the pixel 606 of the digital object (e.g., the diagonal distance) as the relative distance for the pixels 604, 606. In some cases, the height-based shadowing system 106 utilizes this diagonal distance as an additional or an alternative geometry-aware buffer channel.

Further, it should be noted that the relative pixel height differences and relative distances described above are measured in pixels. Indeed, in one or more embodiments, the height-based shadowing system 106 determines relative pixel height differences and relative distances in the pixel domain (e.g., per the image space portrayed within the digital image). The height-based shadowing system 106, however, utilizes various metrics in measuring relative pixel height differences and relative distances in different embodiments.

Figure 7:
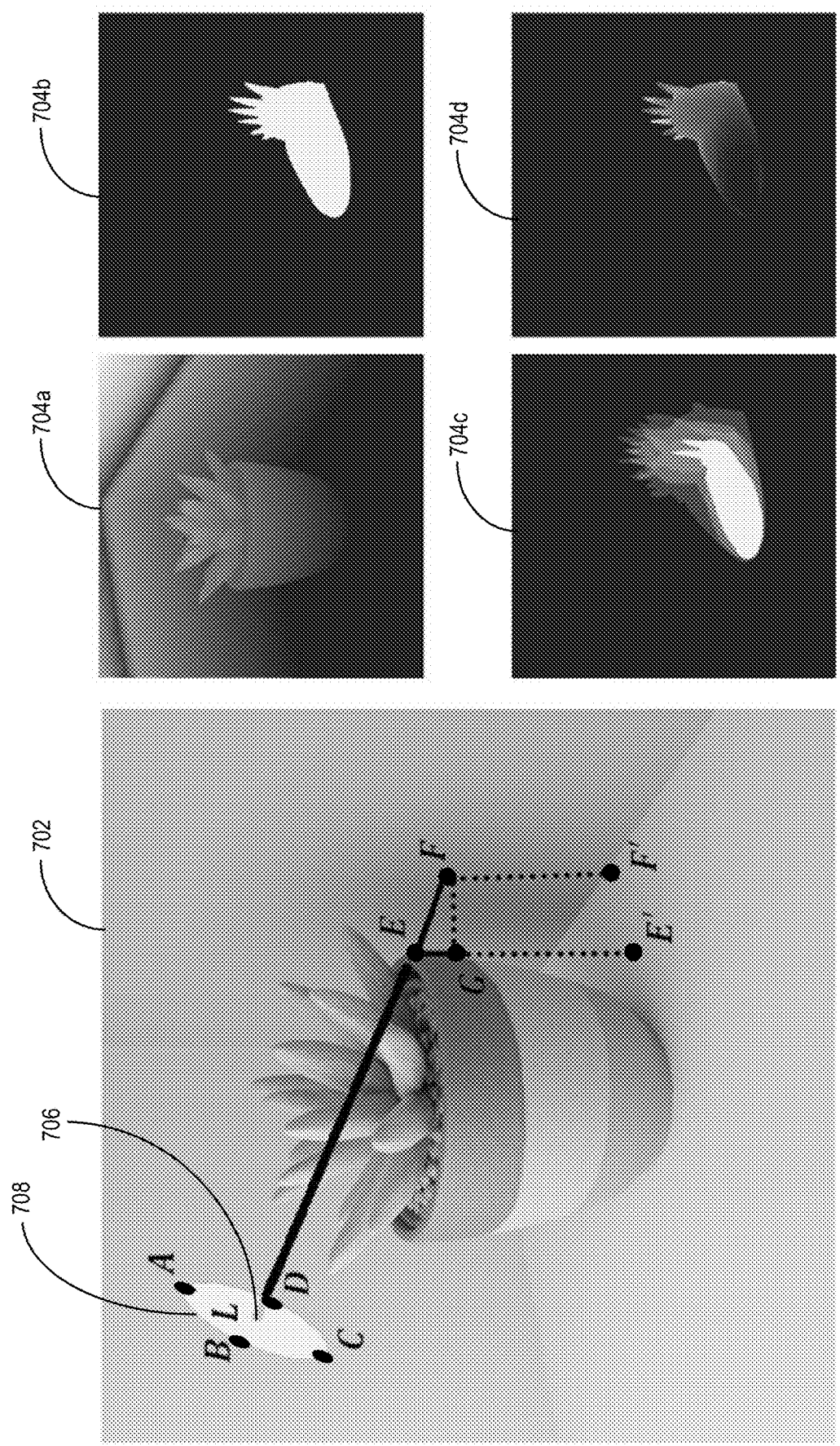
FIG. 7 illustrates additional exemplary geometry-aware buffer channels generated from a digital image in accordance with one or more embodiments.

FIG. 7 illustrates exemplary geometry-aware buffer channels generated from a digital image in accordance with one or more embodiments. In particular, FIG. 7 illustrates one or more exemplary geometry-aware buffer channels that have not yet been described.

FIG. 7 illustrates a digital image 702 and geometry-aware buffer channels 704a-704d generated from the digital image 702. The geometry-aware buffer channel 704a includes the object height map and the background height map corresponding to the digital image 702. Indeed, in some implementations, the height-based shadowing system 106 utilizes at least one of the height maps generated for a digital image as a geometry-aware buffer channel for that digital image. For instance, in some cases, the height-based shadowing system 106 utilizes the object height map to provide the geometry of the digital object and utilizes the background height map to provide the geometry of the background.

Though FIG. 7 shows the height maps combined into a single geometry-aware buffer channel, the height-based shadowing system 106 utilizes each height map as a separate geometry-aware buffer channel in some embodiments. Further, in some cases, the height-based shadowing system 106 utilizes the object height map combined with at least one gradient of the background height map as a geometry-aware buffer channel.

The geometry-aware buffer channel 704b includes a hard object shadow generated for digital object portrayed in the digital image 702. In particular, the geometry-aware buffer channel 704b includes a hard object mask generated with respect to a point light source 706 (represented as L). As indicated by FIG. 7, the point light source 706 corresponds to the center of the area light source 708. In other words, the height-based shadowing system 106 identifies the area light source 708, determines the center of the area light source 708, and treats the center as a point light source in generating the hard object shadow for the geometry-aware buffer channel 704b.

The geometry-aware buffer channel 704c includes sparse hard object shadows for the digital object of the digital image 702. In one or more embodiments, the height-based shadowing system 106 generates the geometry-aware buffer channel 704c in accordance with the area light source 708 of the digital image. For instance, in some cases, the height-based shadowing system 106 selects multiple points from the area light source 708, such as multiple points from the border of the area light source 708 (e.g., the points A, B, C, and D shown in FIG. 7). In some cases, the points are spaced evenly throughout the area light source 708. The height-based shadowing system 106 further generates a hard object shadow for the digital object using each of the select points. In particular, the height-based shadowing system 106 generates the hard object shadows as if each of the selected points were a point light source.

In one or more embodiments, the height-based shadowing system 106 utilizes the sparse hard shadow objects of the geometry-aware buffer channel 704c to guide the shadow stylization neural network with regard to the shadow receiver's geometry. Additionally, in some cases, the height-based shadowing system 106 utilizes the sparse hard object shadows to indicate a boundary for the resulting soft object shadow. The sparse hard object shadows further indicate the darker areas of the soft object shadow via their overlapping areas in some implementations.

The geometry-aware buffer channel 704d includes relative distances for pixels within the digital image 702. In some embodiments, the height-based shadowing system 106 determines the relative distances as described above with reference to FIG. 6. In some cases, the height-based shadowing system 106 utilizes the relative distances of the geometry-aware buffer channel 704d to define the relative spatial distance between the occluder (i.e., the digital object) and the shadow receiver (i.e., the background). In some cases, the height-based shadowing system 106 generates portions of soft object shadows that are relatively softer based on relatively longer distances. In some embodiments, the height-based shadowing system 106 defines relative distance as follows: $\|(u_p, v_p, h_p)-(u_q, v_q, h_q)\|_2^2$ where p and q are two points, u and v are the coordinates in pixel space, and h is the pixel height.

As previously mentioned, the height-based shadowing system 106 operates with improved accuracy when compared to conventional systems. In particular, the height-based shadowing system 106 generates a soft object shadow that more accurately reflects a shadow projection of a digital object across a background of a digital image. Researchers have conducted studies to determine the accuracy of the height-based shadowing system 106 compared to conventional systems. FIG. 8 illustrates a table showing the result of the studies.

The table of FIG. 8 compares the performance of at least one embodiment of the height-based shadowing system 106 (labeled Buffer channels) to the performance of various embodiments of a soft shadow network (SSN). For instance, the first shown soft shadow network (labeled SSN) represents the network described by Yichen Sheng et al., *SSN: Soft Shadow Network for Image Compositing*, Proceedings of the IEEE/CVF Conference on Computer Vision and Pattern Recognition, pages 4380-4390, 2021. The second shown soft shadow network (labeled SSN w. BG-H) represents a modification to the SSN that uses a background height map in its shadow rendering process. To obtain ground truth soft object shadows, the researchers followed the method described in Yichen Shen et al. by rendering a soft object shadow for each hard object shadow using a disk-shaped area light. To accelerate the dataset generation, the researchers rendered a set of shadow bases and then computed the soft object shadows via integration over the area light.

As shown in FIG. 8, the table compares the performances of the tested models using a L2 norm metric, a structural similarity index measure (SSIM) metric, and a peak signal-to-noise ratio (PSNR) metric. As illustrated in FIG. 8, the height-based shadowing system 106 provides improved performance compared to the other tested models with respect to each of the metrics shown.

Figure 9:
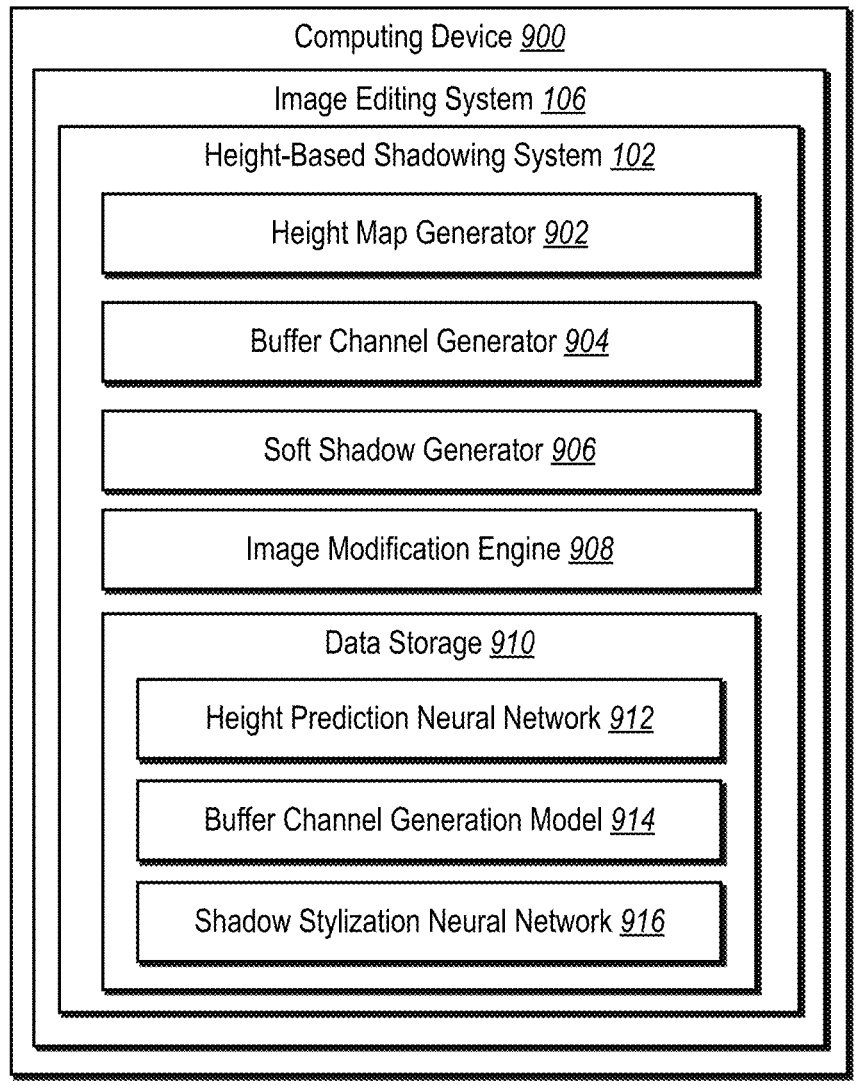
FIG. 9 illustrates an example schematic diagram of a height-based shadowing system in accordance with one or more embodiments.

Turning to FIG. 9, additional detail will now be provided regarding various components and capabilities of the height-based shadowing system 106. In particular, FIG. 9 illustrates the height-based shadowing system 106 implemented by the computing device 900 (e.g., the server(s) 102 and/or one of the client devices 110a-110n discussed above with reference to FIG. 1). Additionally, the height-based shadowing system 106 is also part of the image editing system 104. As shown, in one or more embodiments, the height-based shadowing system 106 includes, but is not limited to, a height map generator 902, a buffer channel generator 904, a soft shadow generator 906, an image modification engine 908, and data storage 910 (which includes a height prediction neural network 912, a buffer channel generation model 914, and a shadow stylization neural network 916).

As just mentioned, and as illustrated in FIG. 9, the height-based shadowing system 106 includes the height map generator 902. In one or more embodiments, the height map generator 902 generates height maps for portions of digital images. In particular, in some embodiments, the height map generator 902 generates an object height map for a digital object portrayed in a digital image and/or a background height map for a background portrayed in a digital image. In some implementations, the height map generator 902 utilizes a height prediction neural network to generate the height maps.

Additionally, as shown in FIG. 9, the height-based shadowing system 106 includes the buffer channel generator 904. In one or more embodiments, the buffer channel generator 904 generates geometry-aware buffer channels for digital images. In particular, in some embodiments, the buffer channel generator 904 generates one or more geometry-aware buffer channels for a digital image for use in generate a soft object shadow for the digital image. In some implementations, the buffer channel generator 904 uses a buffer channel generation model to generate the geometry-aware buffer channels. Further, in some cases, the height-based shadowing system 106 one or more of the geometry-aware buffer channels for a digital image based on one or more height maps corresponding to the digital image.

Further, as shown in FIG. 9, the height-based shadowing system 106 includes the soft shadow generator 906. In one or more embodiments, the soft shadow generator 906 generates soft object shadows for digital objects portrayed in digital image. In particular, in some instances, the soft shadow generator 906 generates a soft object shadow for a digital image based on one or more geometry-aware buffer channels that correspond to the digital image. In some implementations, the soft shadow generator 906 utilizes a shadow stylization neural network to generate the soft object shadows.

As shown in FIG. 9, the height-based shadowing system 106 further includes the image modification engine 908. In one or more embodiments, the image modification engine 908 modifies digital images to include soft object shadows. In particular, in some embodiments, the image modification engine 908 modifies a digital image to include a soft object shadow generated for a digital object portrayed in the digital image. In some cases, the height-based shadowing system 106 modifies a digital image by modifying the relevant pixels (e.g., pixels corresponding to the shadow of a digital object) to include shadow pixels. As previously suggested, in some cases, the image modification is performed along with the rendering of the soft object shadow.

Additionally, as shown in FIG. 9, the height-based shadowing system 106 includes data storage 910. In particular, data storage 910 includes the height prediction neural network 912, the buffer channel generation model 914, and the shadow stylization neural network 916 utilized in generating object shadows for digital objects portrayed in digital images.

Each of the components 902-916 of the height-based shadowing system 106 optionally include software, hardware, or both. For example, the components 902-916 include one or more instructions stored on a computer-readable storage medium and executable by processors of one or more computing devices, such as a client device or server device. When executed by the one or more processors, the computer-executable instructions of the height-based shadowing system 106 cause the computing device(s) to perform the methods described herein. Alternatively, the components 902-916 include hardware, such as a special-purpose processing device to perform a certain function or group of functions. Alternatively, the components 902-916 of the height-based shadowing system 106 include a combination of computer-executable instructions and hardware.

Furthermore, the components 902-916 of the height-based shadowing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-916 of the height-based shadowing system 106 may be implemented as a stand-alone application, such as a desktop or mobile application. Furthermore, the components 902-916 of the height-based shadowing system 106 may be implemented as one or more web-based applications hosted on a remote server. Alternatively, or additionally, the components 902-916 of the height-based shadowing system 106 may be implemented in a suite of mobile device applications or "apps." For example, in one or more embodiments, the height-based shadowing system 106 comprises or operates in connection with digital software applications such as ADOBE® AFTER EFFECTS®, ADOBE® ILLUSTRATOR®, or ADOBE® PHOTOSHOP®. The foregoing are either registered trademarks or trademarks of Adobe Inc. in the United States and/or other countries.

Figure 10:
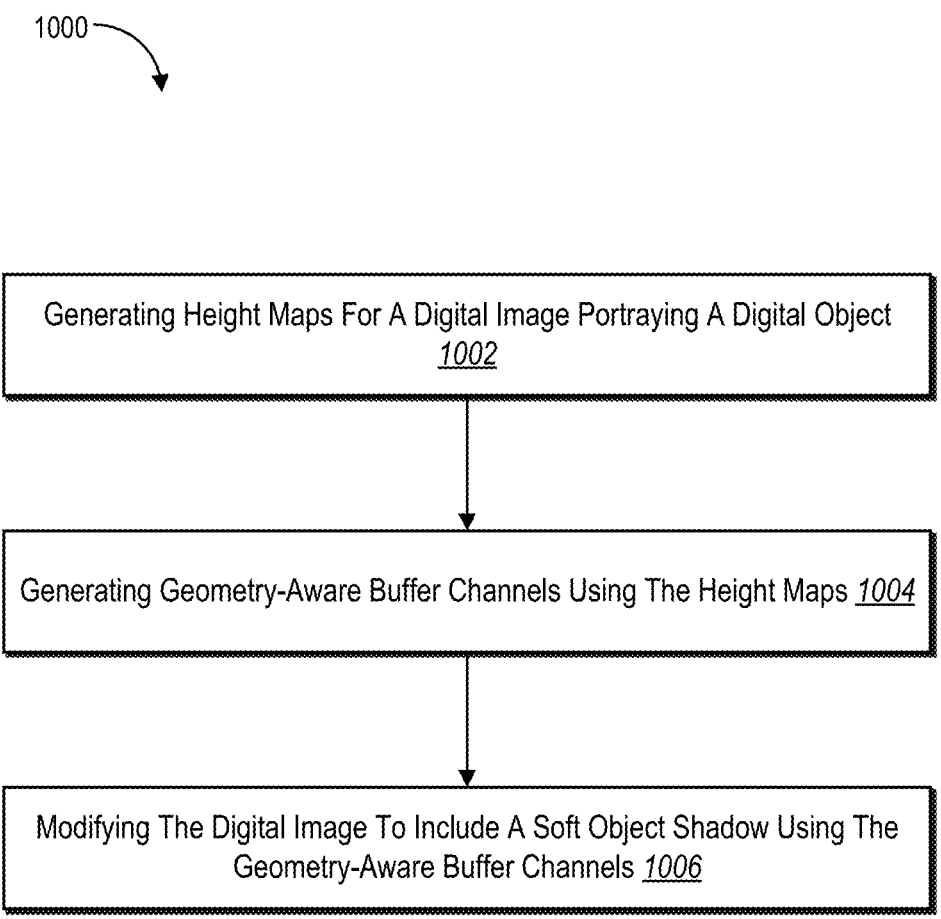
FIG. 10 illustrates a flowchart for a series of acts for generating an object shadow for a digital object within a digital image using geometry-aware buffer channels in accordance with one or more embodiments.

FIGS. 1-9, the corresponding text, and the examples provide a number of different methods, systems, devices, and non-transitory computer-readable media of the height-based shadowing system 106. In addition to the foregoing, one or more embodiments can also be described in terms of flowcharts comprising acts for accomplishing the particular result, as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

FIG. 10 illustrates a flowchart for a series of acts 1000 for generating an object shadow for a digital object using geometry-aware buffer channels in accordance with one or more embodiments. FIG. 10 illustrates acts according to one embodiment, alternative embodiments may omit, add to, reorder, and/or modify any of the acts shown in FIG. 10. In some implementations, the acts of FIG. 10 are performed as part of a method. Alternatively, a non-transitory computer-readable medium can store executable instructions that, when executed by a processing device, cause the processing device to perform operations comprising the acts of FIG. 10. In some embodiments, a system performs the acts of FIG. 10. For example, in one or more embodiments, a system includes one or more memory components. The system further includes one or more processing devices coupled to the one or more memory components, the one or more processing devices to perform operations comprising the acts of FIG. 10.

The series of acts 1000 includes an act 1002 for generating height maps for a digital image portraying a digital object. For example, in one or more embodiments, the act 1002 involves generating, utilizing a height prediction neural network, an object height map for a digital object portrayed in a digital image and a background height map for a background portrayed in the digital image.

The series of acts 1000 also includes an act 1004 for generating geometry-aware buffer channels using the height maps. For instance, in one or more embodiments, the act 1004 involves generating, from the digital image, a plurality of geometry-aware buffer channels using the object height map and the background height map.

In one or more embodiments, generating, from the digital image, the plurality of geometry-aware buffer channels using the object height map and the background height map comprises generating a first geometry-aware buffer channel that includes a first gradient of the background height map in a first direction. Further, in some embodiments, generating, from the digital image, the plurality of geometry-aware buffer channels using the object height map and the background height map comprises generating a second geometry-aware buffer channel that includes a second gradient of the background height map in a second direction.

In some implementations, generating, from the digital image, the plurality of geometry-aware buffer channels using the object height map and the background height map comprises generating a geometry-aware buffer channel that includes relative distances for pixels of the background and corresponding pixels of the digital object utilizing the object height map. In some instances, generating, from the digital image, the plurality of geometry-aware buffer channels comprises generating, from the digital image, one or more geometry-aware buffer channels using at least one of a position of a light source associated with the digital image or a horizon associated with the digital image. Further, in some cases, generating, from the digital image, the plurality of geometry-aware buffer channels using the object height map and the background height map comprises generating, from the digital image, a geometry-aware buffer channel that includes sparse hard object shadows cast by the digital object in accordance with an area light source associated with digital image.

Further, the series of acts 1000 includes an act 1006 for modifying the digital image to include a soft object shadow using the geometry-aware buffer channels. To illustrate, in one or more embodiments, the act 1006 involves modifying the digital image to include a soft object shadow for the digital object using the plurality of geometry-aware buffer channels.

In one or more embodiments, modifying the digital image to include the soft object shadow for the digital object using the plurality of geometry-aware buffer channels comprises modifying the digital image utilizing a shadow stylization neural network to include the soft object shadow for the digital object based on the plurality of geometry-aware buffer channels. In some cases, the height-based shadowing system 106 further determines a softness value for the soft object shadow. Accordingly, in some implementations, modifying the digital image to include the soft object shadow for the digital object using the plurality of geometry-aware buffer channels comprises modifying the digital image to include the soft object shadow for the digital object using the plurality of geometry-aware buffer channels and the softness value.

To provide an illustration, in one or more embodiments, the height-based shadowing system 106 determines an object height map for a digital object portrayed in a digital image and a background height map for a background portrayed in the digital image; generates, from the digital image, a plurality of geometry-aware buffer channels using the object height map and the background height map; and modifies the digital image to include a soft object shadow for the digital object using the plurality of geometry-aware buffer channels.

In some embodiments, generating, from the digital image, the plurality of geometry-aware buffer channels using the object height map and the background height map comprises generating a geometry-aware buffer channel that includes relative pixel height differences for pixels of the background and corresponding pixels of the digital object utilizing the object height map and the background height map. In some cases, generating the geometry-aware buffer channel that includes the relative pixel height differences for the pixels of the background and the corresponding pixels of the digital object utilizing the object height map and the background height map comprises: determining a first pixel height for a pixel of the background using the background height map; determining a second pixel height for a pixel of the digital object that corresponds to the pixel of the background using the object height map; and determining a height difference between the first pixel height and the second pixel height. In some implementations, the height-based shadowing system 106 determines the pixel of the digital object that corresponds to the pixel of the background by determining that the pixel of the digital object is blocking light from reaching the pixel of the background.

In one or more embodiments, generating, from the digital image, a plurality of geometry-aware buffer channels using the object height map and the background height map comprises generating a geometry-aware buffer channel that includes a hard object shadow for the digital object using the object height map and the background height map; and modifying the digital image to include the soft object shadow for the digital object using the plurality of geometry-aware buffer channels comprises modifying the hard object shadow of the geometry-aware buffer channel to generate the soft object shadow within the digital image.

In some cases, generating, from the digital image, the plurality of geometry-aware buffer channels using the object height map and the background height map comprises generating geometry-aware buffer channels that are translation invariant by generating one or more geometry-aware buffer channels that include a gradient of the background height map. Further, in some instances, generating, from the digital image, the plurality of geometry-aware buffer channels using the object height map and the background height map comprises generating a geometry-aware buffer channel that includes relative distances for pixels of the background and corresponding pixels of the digital object utilizing the object height map, a relative distance for a pixel of the background and a corresponding pixel of the digital object comprising a distance between the pixel of the background and a ground point corresponding to the pixel of the digital object.

To provide another illustration, in one or more embodiments, the height-based shadowing system 106 receives a digital image portraying a digital object against a non-planar background; generates, utilizing a height prediction neural network, an object height map for the digital object and a background height map for the non-planar background of the digital image; generating a first geometry-aware buffer channel that includes a hard object shadow for the digital object using the object height map; generating a second geometry-aware buffer channel that includes a gradient of the background height map; and modifying the digital image to include a soft object shadow for the digital object across the non-planar background using the first geometry-aware buffer channel and the second geometry-aware buffer channel.

In some embodiments, generating the second geometry-aware buffer channel that includes the gradient of the background height map comprises generating the second geometry-aware buffer channel that includes a first gradient of the background height map in an x-direction. In some cases, the height-based shadowing system 106 further generates a third geometry-aware buffer channel that includes a second gradient of the background height map in a y-direction. In some instances, the height-based shadowing system 106 further generates a fourth geometry-aware buffer channel that includes an object cutout corresponding to the digital object. Accordingly, in some implementations, the height-based shadowing system 106 modifies the digital image to include the soft object shadow for the digital object across the non-planar background using the first geometry-aware buffer channel and the second geometry-aware buffer channel by modifying the digital image to include the soft object shadow using the first geometry-aware buffer channel, the second geometry-aware buffer channel, the third geometry-aware buffer channel, and the fourth geometry-aware buffer channel.

In one or more embodiments, modifying the digital image to include the soft object shadow for the digital object across the non-planar background comprises modifying the digital image to include the soft object shadow across a first surface and a second surface of the non-planar background, wherein the first surface is associated with a first plane portrayed within the digital image and the second surface is associated with a second plane portrayed within the digital image.

In some cases, the height-based shadowing system 106 further receives a softness value for the soft object shadow from a client device. Accordingly, in some embodiments, modifying the digital image to include the soft object shadow for the digital object across the non-planar background using the first geometry-aware buffer channel and the second geometry-aware buffer channel comprises modifying, using a shadow stylization neural network, the digital image to include the soft object shadow using first geometry-aware buffer channel, the second geometry-aware buffer channel, and the softness value.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
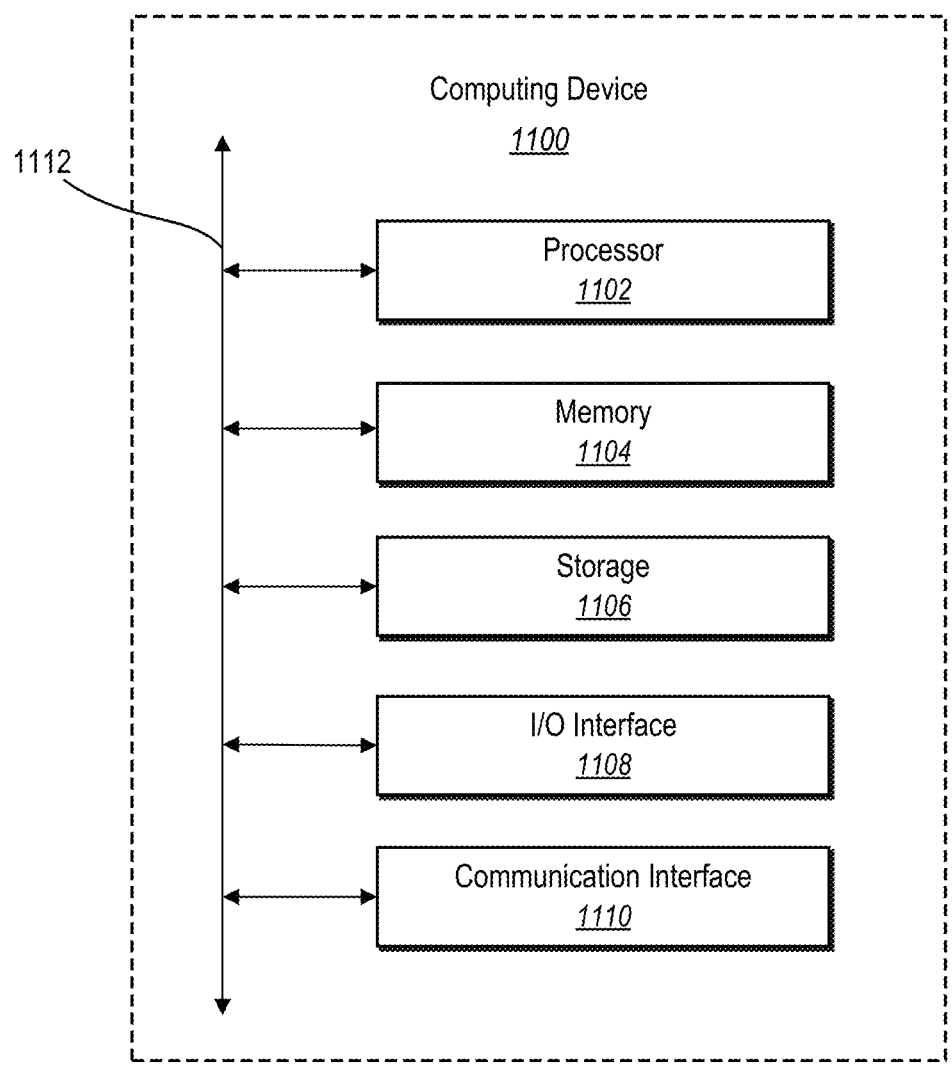
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 102 and/or the client devices 110a-110n). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
generating, utilizing a height prediction neural network, an object height map for a digital object portrayed in a digital image and a background height map for a background portrayed in the digital image,
wherein the object height map includes pixel heights that indicate vertical distances of pixels associated with the digital object from a ground surface of the digital image within a two-dimensional coordinate scheme of the digital image; and
wherein the background height map includes additional pixel heights that indicate additional vertical distances of pixels associated with the background from the ground surface within the two-dimensional coordinate scheme;
generating, from the digital image, a plurality of geometry-aware buffer channels using the pixel heights included in the object height map and the additional pixel heights included in the background height map; and
modifying the digital image to include a soft object shadow for the digital object using the plurality of geometry-aware buffer channels.

2. The method of claim 1, wherein generating, from the digital image, the plurality of geometry-aware buffer channels using the pixel heights included in the object height map and the additional pixel heights included in the background height map comprises generating a first geometry-aware buffer channel that includes a first gradient of the additional pixel heights included in the background height map in a first direction.

3. The method of claim 2, wherein generating, from the digital image, the plurality of geometry-aware buffer channels using the pixel heights included in the object height map and the additional pixel heights included in the background height map comprises generating a second geometry-aware buffer channel that includes a second gradient of the additional pixel heights included in the background height map in a second direction.

4. The method of claim 1, wherein generating, from the digital image, the plurality of geometry-aware buffer channels using the pixel heights included in the object height map and the additional pixel heights included in the background height map comprises generating a geometry-aware buffer channel that includes relative distances for pixels of the background and corresponding pixels of the digital object utilizing the additional pixel heights included in the object height map.

5. The method of claim 1, wherein modifying the digital image to include the soft object shadow for the digital object using the plurality of geometry-aware buffer channels comprises modifying the digital image utilizing a shadow stylization neural network to include the soft object shadow for the digital object based on the plurality of geometry-aware buffer channels.

6. The method of claim 1,
further comprising determining a softness value for the soft object shadow,
wherein modifying the digital image to include the soft object shadow for the digital object using the plurality of geometry-aware buffer channels comprises modifying the digital image to include the soft object shadow for the digital object using the plurality of geometry-aware buffer channels and the softness value.

7. The method of claim 1, wherein generating, from the digital image, the plurality of geometry-aware buffer channels comprises generating, from the digital image, one or more geometry-aware buffer channels using at least one of a position of a light source associated with the digital image or a horizon associated with the digital image.

8. The method of claim 1, wherein generating, from the digital image, the plurality of geometry-aware buffer channels using the pixel heights included in the object height map and the additional pixel heights included in the background height map comprises generating, from the digital image, a geometry-aware buffer channel that includes sparse hard object shadows cast by the digital object in accordance with an area light source associated with digital image.

9. A non-transitory computer-readable medium storing executable instructions, which when executed by a processing device, cause the processing device to perform operations comprising:
determining, utilizing a height prediction neural network, an object height map for a digital object portrayed in a digital image and a background height map for a background portrayed in the digital image,
wherein the object height map includes pixel heights that indicate vertical distances of pixels associated with the digital object from a ground surface of the digital image within a two-dimensional coordinate scheme of the digital image; and
wherein the background height map includes additional pixel heights that indicate additional vertical distances of pixels associated with the background from the ground surface within the two-dimensional coordinate scheme;
determining, from the digital image, a plurality of geometry-aware buffer channels using pixel heights included in the object height map and the additional pixel heights included in the background height map; and
modifying the digital image to include a soft object shadow for the digital object using the plurality of geometry-aware buffer channels.

10. The non-transitory computer-readable medium of claim 9, wherein determining, from the digital image, the plurality of geometry-aware buffer channels using the pixel heights included in the object height map and the additional pixel heights included in the background height map comprises generating a geometry-aware buffer channel that includes relative pixel height differences for pixels of the background and corresponding pixels of the digital object utilizing the pixel heights included in the object height map and the additional pixel heights included in the background height map.

11. The non-transitory computer-readable medium of claim 10, wherein determining the geometry-aware buffer channel that includes the relative pixel height differences for the pixels of the background and the corresponding pixels of the digital object utilizing the pixel heights included in the object height map and the additional pixel heights included in the background height map comprises:
determining a first pixel height for a pixel of the background using the additional pixel heights included in the background height map;
determining a second pixel height for a pixel of the digital object that corresponds to the pixel of the background using the pixel heights included in the object height map; and determining a height difference between the first pixel height and the second pixel height.

12. The non-transitory computer-readable medium of claim 11, wherein the operations further comprise determining the pixel of the digital object that corresponds to the pixel of the background by determining that the pixel of the digital object is blocking light from reaching the pixel of the background.

13. The non-transitory computer-readable medium of claim 9, wherein:
  determining, from the digital image, a plurality of geometry-aware buffer channels using the pixel heights included in the object height map and the additional pixel heights included in the background height map comprises generating a geometry-aware buffer channel that includes a hard object shadow for the digital object using the pixel heights included in the object height map and the additional pixel heights included in the background height map; and
  modifying the digital image to include the soft object shadow for the digital object using the plurality of geometry-aware buffer channels comprises modifying the hard object shadow of the geometry-aware buffer channel to generate the soft object shadow within the digital image.

14. The non-transitory computer-readable medium of claim 9, wherein determining, from the digital image, the plurality of geometry-aware buffer channels using the pixel heights included in the object height map and the additional pixel heights included in the background height map comprises generating geometry-aware buffer channels that are translation invariant by generating one or more geometry-aware buffer channels that include a gradient of the additional pixel heights included in the background height map.

15. The non-transitory computer-readable medium of claim 9, wherein determining, from the digital image, the plurality of geometry-aware buffer channels using the pixel heights included in the object height map and the additional pixel heights included in the background height map comprises generating a geometry-aware buffer channel that includes relative distances for pixels of the background and corresponding pixels of the digital object utilizing the pixel heights included in the object height map, a relative distance for a pixel of the background and a corresponding pixel of the digital object comprising a distance between the pixel of the background and a ground point corresponding to the pixel of the digital object.

16. A system comprising:
  one or more memory components; and
  one or more processing devices coupled to the one or more memory components, the one or more processing devices to perform operations comprising:
    receiving a digital image portraying a digital object against a non-planar background;
    generating, utilizing a height prediction neural network, an object height map for the digital object and a background height map for the non-planar background of the digital image,
      wherein the object height map includes pixel heights that indicate vertical distances of pixels associated with the digital object from a ground surface of the digital image; and
      wherein the background height map includes additional pixel heights that indicate additional vertical distances of pixels associated with the non-planar background from the ground surface;
    generating a first geometry-aware buffer channel that includes a hard object shadow for the digital object using the pixel heights included in the object height map;
    generating a second geometry-aware buffer channel that includes a gradient of the additional pixel heights included in the background height map; and
    modifying the digital image to include a soft object shadow for the digital object across the non-planar background using the first geometry-aware buffer channel and the second geometry-aware buffer channel.

17. The system of claim 16, wherein:
generating the second geometry-aware buffer channel that includes the gradient of the additional pixel heights included in the background height map comprises generating the second geometry-aware buffer channel that includes a first gradient of the additional pixel heights included in the background height map in an x-direction; and
the one or more processing devices further perform operations comprising generating a third geometry-aware buffer channel that includes a second gradient of the additional pixel heights included in the background height map in a y-direction.

18. The system of claim 17, wherein:
the one or more processing devices further perform operations comprising generating a fourth geometry-aware buffer channel that includes an object cutout corresponding to the digital object; and
modifying the digital image to include the soft object shadow for the digital object across the non-planar background using the first geometry-aware buffer channel and the second geometry-aware buffer channel comprises modifying the digital image to include the soft object shadow using the first geometry-aware buffer channel, the second geometry-aware buffer channel, the third geometry-aware buffer channel, and the fourth geometry-aware buffer channel.

19. The system of claim 16, wherein modifying the digital image to include the soft object shadow for the digital object across the non-planar background comprises modifying the digital image to include the soft object shadow across a first surface and a second surface of the non-planar background, wherein the first surface is associated with a first plane portrayed within the digital image and the second surface is associated with a second plane portrayed within the digital image.

20. The system of claim 16, wherein:
the one or more processing devices further perform operations comprising receiving a softness value for the soft object shadow from a client device; and
modifying the digital image to include the soft object shadow for the digital object across the non-planar background using the first geometry-aware buffer channel and the second geometry-aware buffer channel comprises modifying, using a shadow stylization neural network, the digital image to include the soft object shadow using first geometry-aware buffer channel, the second geometry-aware buffer channel, and the softness value.

* * * * *